United States Patent Office 3,812,107
Patented May 21, 1974

3,812,107
β-HYDROXYALKYLATED HYDRAZONE DYESTUFFS
Gunther Boehmke, Leverkusen-Grossendriesch, and Ernst Schmitt, Cologne, Germany, assignors to Bayer Aktiengesellschaft, Leverkusen, Germany
No Drawing. Filed May 2, 1972, Ser. No. 249,649
Claims priority, application Germany, May 4, 1971, P 21 22 038.2
Int. Cl. C09b 23/00
U.S. Cl. 260—240 G                    13 Claims

ABSTRACT OF THE DISCLOSURE

Hydrazone dyestuffs of the formula

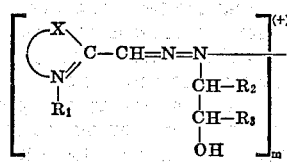

wherein $R_1$ denotes alkyl, aralkyl, aryl, cycloalkyl or a radical of the formula

$R_2$ and $R_3$ denote hydrogen, alkyl or alkenyl, $R_4$ and $R_5$ denote hydrogen, alkyl, alkenyl, alkinyl, aryl, aralkyl or carboxyl, X denotes the residual constituent of a 5-membered or 6-membered heterocyclic ring, B denotes an aromatic or heterocyclic radical, $m$ denotes the numbers 1 or 2 and $An^{(-)}$ denotes an anion, are valuble for dyeing and printing of natural and synthetic materials.

The subject of the invention are hydrazone dyestuffs of the formula

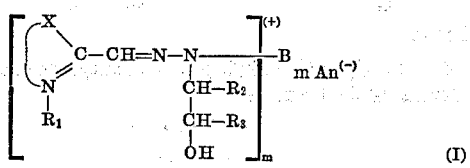 (I)

wherein
$R_1$ denotes alkyl, aralkyl, aryl, cycloalkyl or a radical of the formula

$R_2$ denotes hydrogen, alkyl or alkenyl,
$R_3$ denotes hydrogen, alkyl or alkenyl,
$R_4$ denotes hydrogen, alkyl, alkenyl, alkinyl, aryl, aralkyl or carboxyl,
$R_5$ denotes hydrogen, alkyl, alkenyl, alkinyl, aryl, aralkyl or carboxyl,
X denotes the residual constituent of a 5-membered or 6-membered heterocyclic ring,
B denotes an aromatic or heterocyclic radical,
$m$ denotes the numbers 1 or 2 and
$An^{(-)}$ denotes an anion and
the alkyl, alkenyl, alkinyl, aralkyl, aryl, cycloalkyl and heterocyclic radicals can be substituted by non-ionic substituents or by a carboxyl group.

The invention also relates to mixtures of these hydrazone dyestuffs. A further subject of the invention are processes for the manufacture of these dyestuffs and their use for dyeing and printing natural and synthetic materials, as well as the materials dyed and printed with these dyestuffs.

Non-ionic substituents are, for example, alkyl radicals such as methyl, ethyl, n-propyl, n-butyl, n-pentyl, isopropyl, isobutyl, tert.-butyl, pentyl, n-hexyl, 2-ethylhexyl, n-octyl, octyl, n-nonyl, nonyl, n-decyl, decyl, n-dodecyl, dodecyl, n-octadecyl and n-hexadecyl, alkenyl radicals such as vinyl, allyl, methallyl, crotyl, hexen-(2-yl, and 2-ethylhexen-(2)-yl, alkinyl such as ethinyl, and propargyl, cycloalkyl radicals such as cyclohexyl and 2-methylcyclohexyl, aryl radicals such as phenyl, p-chlorophenyl and p-methoxyphenyl, aralkyl radicals such as benzyl, 4-methylbenzyl, 4-methoxybenzyl and phenethyl, aralkenyl radicals such as styryl, alkoxy radicals such as methoxy, ethoxy, n-propxy, n-butoxy, n-hexyloxy, n-octyloxy, n-decyloxy and n-dodecyloxy, alkenoxy radicals such as allyloxy, methallyloxy and crotyloxy, alkinoxy radicals such as propargyloxy, aryloxy radicals such as phenoxy, 2-methylphenoxy, 3-methylphenoxy, 4-methylphenoxy, 2-chlorophenoxy, 3-chlorophenoxy, 4-chlorophenoxy, 4-nitrophenylphenoxy, 4-methoxyphenoxy, 4-ethoxyphenoxy and 4-methylmercaptophenoxy, carboalkoxy radicals such as carbomethoxy, acyloxy radicals such as acetoxy, alkylmercapto radicals such as methylmercapto and ethylmercapto, arylmercapto radicals such as phenylmercapto and 4-methylphenylmercapto, alkylsulphonyl radicals such as ethylsulphonyl, aminosulphonyl radicals such as dimethylaminosulphonyl, arylamino radicals such as phenylamine, acylamino radicals such as acetylamino, alkylsulphonylamino radicals such as ethylsulphonylamino and also halogen such as fluorine, chlorine and bromine and nitrile, cyanato, isocyanato, nitro, hydroxyl and mercapto.

Suitable alkyl radicals are, for example, the methyl, ethyl, n-propyl or n-butyl radical and their derivatives which are substituted by the abovementioned radicals, such as chloromethyl, trifluoromethyl, β-chloroethyl, β-methoxyethyl β-cyanoethyl and β-hydroxyethyl.

Suitable alkenyl radicals are, for example, the allyl, methallyl or crotyl radical and their derivatives which are substituted by the abovementioned radicals, such as γ-chloroallyl.

Suitable alkinyl radicals are, for example, the propargyl or butin-(2)-yl-(1) radical.

Possible anionic radicals $An^-$ are the organic and inorganic anions which are customary for cationic dyestuffs.

Inorganic anions are, for example, fluoride, chloride, bromide and iodide, perchlorate, hydroxyl, radicals of S-containing acids, such as bisulphate, sulphate, disulphate and aminosulphate; radicals of nitrogen-oxygen acids, such as nitrate; radicals of oxygen acids of phosphorus, such as dihydrogenphosphate, hydrogenphosphate, phosphate and metaphosphate; radicals of carbonic acids such as bicarbonate and carbonate; further anions of oxygen-acids and complex acids, such as methosulphate, ethosulphate, hexafluorosilicate, cyanate, thiocyanate, ferrocyanide, ferricyanide, trichlorozincate and tetrachlorozincate, tribromozincate and tetrabromozincate, stannate, borate, divanadate, tetravanadate, molybdate, tungstate, chromate, bichromate and tetrafluoroborate, as well as anions of esters of boric acid, such as of the glycerine ester of boric acid and of esters of phosphoric acid, such as of methyl phosphate.

Organic anions are, for example, radicals of saturated or unsaturated aliphatic, cycloaliphatic, aromatic and heterocyclic carboxylic acids and sulphonic acids, such as radicals of acetic acid, chloroacetic acid, cyanoacetic acid, hydroxyacetic acid, aminoacetic acid, methylaminoacetic acid, aminoethylsulphonic acid, methylaminoethylsulphonic acid, propionic acid, n-butyric acid, i-butyric acid, 2-methyl-butyric acid, 2-ethyl-butyric acid, dichloroacetic acid, trichloroacetic acid, trifluoroacetic acid, 2-chloropropionic acid, 3-chloropropionic acid, 2-chlorobutyric acid, 2 - hydroxypropionic acid, 3-hydroxypropionic acid, O-ethyl-glycollic acid, thioglycollic acid, glyceric acid, malic acid, dodecyltetraethyleneglycol-ether-propionic acid, 3-(nonyloxy)-propionic acid, 3-(isotridecyloxy)-propionic acid, 3-(isotridecyloxy)-diethyleneglycol-ether-propionic acid, the ether-propionic acid from the mixture of alcohols with 6 to 10 carbon atoms, thioacetic acid, 6-benzoylamino-2-chlorocaproic acid, nonylphenoltetraethyleneglycol-ether-propionic acid, nonylphenoldiethyleneglycol-ether-propionic acid, dodecyltetraethyleneglycol-ether-propionic acid, phenoxyacetic acid, nonylphenoxyacetic acid, n-valeric acid, i valeric acid, 2,2,2-trimethyl-acetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic acid 911 of Messrs. Shell), a mixture of aliphatic carboxylic acids with 15 to 19 carbon atoms (Versatic acid 1519 of Messrs. Shell), coconut fatty acid first runnings, undecanecarboxylic acid, n-tridecanecarboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azelaic acid, iminoacetic acid, nitrilosulphonic acid, methanesulphonic the isomer mixture of 2,2,4- and 2,4,4-trimethyladipic acid, sebacic acid, isosebacic acid (isomer mixture), tartaric acid, citric acid, glyoxylic acid, dimethyl-ether-$\alpha,\alpha'$-dicarboxylic acid, methylene-bis-thioglycollic acid, dimethyl-sulphide-$\alpha,\alpha$-dicarboxylic acid, 2,2'-dithio-di-n-propionic acid, fumaric acid, maleic acid, itaconic acid, ethylene-bis-iminoacetic acid, nitrilosulphonic acid, methanesulphonic acid, ethanesulphonic acid, chloromethanesulphonic acid, 2-chloroethanesulphonic acid and 2-hydroxyethanesulphonic acid, and mersolate, that is to say $C_8$–$C_{15}$ paraffin-sulphonic acid obtained by chlorosulphonation of paraffin oil.

Suitable radicals of cycloaliphatic carboxylic acids are, for example, the radicals of cyclohexanecarboxylic acid and cyclohexene-3-carboxylic acid and radicals of araliphatic monocarboxylic acids are, for example, radicals of phenylacetic acid, 4-methylphenylacetic acid and mandelic acid.

Suitable anions of aromatic carboxylic acids are, for example, the radicals of benzoic acid, 2-methylbenzoic acid, 3-methylbenzoic acid, 4-methylbenzoic acid, 4-tert.-butylbenzoic acid, 2-bromobenzoic acid, 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6-chloro-3-nitrobenzoic acid, 2,4-dinitrobenzoic acid, 3,4-dinitrobenzoic acid, 3,5-dinitrobenzoic acid, 2-hydroxybenzoic acid, 3-hydroxybenzoic acid, 4-hydroxybenzoic acid, 2-mercaptobenzoic acid, 4-nitro-3-methylbenzoic acid, 4-aminobenzoic acid, 5-nitro-2-hydroxybenzoic acid, 3-nitro-2-hydroxybenzoic acid, 4-methoxybenzoic acid, 3-nitro-4-methoxybenzoic acid, 4-chloro-3-hydroxybenzoic acid, 3-chloro-4-hydroxybenzoic acid, 5 - chloro - 2 - hydroxy-3-methylbenzoic acid, 4-ethylmercapto-2-chlorobenzoic acid, 2-hydroxy-3-methylbenzoic acid, 6-hydroxy-3-methylbenzoic acid, 2-hydroxy-4-methylbenzoic acid, 6-hydroxy-2,4-dimethylbenzoic acid, 6-hydroxy-3-tert.-butylbenzoic acid, phthalic acid, tetrachlorophthalic acid, 4-hydroxyphthalic acid, 4-methoxyphthalic acid, isophthalic acid, 4-chloroisophthalic acid, 5-nitro-isophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene - 1,4,5,8 - tetracarboxylic acid, biphenyl-4-carboxylic acid, abietic acid, phthalic acid mono-n-butyl ester, terephthalic acid monomethyl ester, 3-hydroxy-5,6,7,8 - tetrahydronaphthalene - 2 - carboxylic acid, 2-hydroxy - 1-naphthoic acid and anthraquinone-2-carboxylic acid.

Suitable radicals of heterocyclic carboxylic acids are, for example, the radicals of pyromucic acid, dehydromucic acid and indolyl-3-acetic acid.

Suitable anions of aromatic sulphonic acids are, for example, the radicals of benzenesulphonic acid, benzene-1,3-disulphonic acid, 4-chlorobenzenesulphonic acid, 3-nitrobenzenesulphonic acid, 6-chloro-3-nitrobenzenesulphonic acid, toluene - 4 - sulphonic acid, toluene-2-sulphonic acid, toluene-$\omega$-sulphonic acid, 2-chlorotoluene-4-sulphonic acid, 1-hydroxybenzenesulphonic acid, n-dodecylbenzenesulphonic acid, 1,2,3,4 - tetrahydronaphthalene-6-sulphonic acid, naphthalene-1-sulphonic acid, naphthalene-1,4-disulphonic acid or naphthalene-1,5-disulphonic acid, naphthalene-1,3,5-trisulphonic acid, 1-naphthol - 2 - sulphonic acid, 5-nitronaphthalene-2-sulphonic acid, 8 - aminonaphthalene-1-sulphonic acid, stilbene-2,2'-disulphonic acid and biphenyl-2-sulphonic acid.

A suitable anion of heterocyclic sulphonic acids is, for example, the radical of quinoline-5-sulphonic acid.

Further possibilities are the radicals of arylsulphinic, arylphosphonic and arylphosphonous acids, such as benzenesulphinic and benzenephosphonic acid.

Colorless or colorless almost anions are preferred. Preferred anions for dyeing from aqueous solution are those which do not excessively impair the solubility of the dyestuffs in water. For dyeing from organic solvents, preferred anions are frequently also those which assist or at least do not adversely influence the solubility of the dyestuff in organic solvents; examples are the anion of tetrapropylenebenzenesulphonic acid, n-dodecylbenzenesulphonic acid, n-tetradecanecarboxylic acid and ethylhexylcarboxylic acid.

A preferred group within the dyestuffs according to the invention are those of the general formula

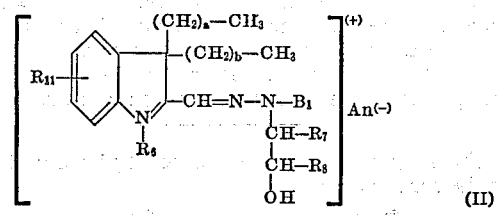

(II)

wherein $R_6$ denotes $C_1$ to $C_{18}$-alkyl, phenyl, benzyl, phenethyl or a radical of the formula

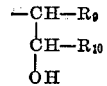

$R_7$ denotes hydrogen, $C_1$ to $C_4$-alkyl, $C_2$ to $C_4$-alkenyl, $C_1$ to $C_4$-alkyloxymethyl, $C_2$ to $C_4$-alkenyloxymethyl or phenoxymethyl, $R_8$ denotes hydrogen, $C_1$ to $C_4$-alkyl, $C_2$ to $C_4$-alkenyl, $C_1$ to $C_4$-alkoxymethyl, $C_2$ to $C_4$-alkenyloxymethyl or phenoxymethyl, with at least one of the radicals $R_7$ or $R_8$ being hydrogen or $C_1$ to $C_4$-alkyl, $R_9$ denotes hydrogen, $C_1$ to $C_{18}$-alkyl, $C_2$ or $C_4$-alkenyl, $C_2$ to $C_4$-alkinyl, phenyl, benzyl, $C_1$ to $C_{12}$-alkoxymethyl, $C_2$ to $C_4$-alkenyloxymethyl, allyloxymethyl or phenoxymethyl, $R_{10}$ denotes hydrogen, $C_1$ to $C_{18}$-alkyl, $C_2$ or $C_4$-alkenyl, $C_2$ to $C_4$-alkinyl, phenyl, benzyl, $C_1$ to $C_{12}$-alkoxymethyl, $C_2$ to $C_4$-alkenyloxymethyl, phenoxymethyl or allyloxymethyl, with at least one of the radicals $R_9$ or $R_{10}$ being hydrogen or $C_1$ to $C_{18}$-alkyl, $R_{11}$ denotes hydrogen or one or more radicals such as halogen, nitrile, nitro, $C_1$ to $C_{12}$-alkyl, phenyl, benzyl, $C_5$ to $C_7$-cycloalkyl, $C_1$ to $C_4$-alkoxy, phenoxy, benzyloxy, amino, $C_1$ to $C_4$-dialkylamino, sulphamoyl, $C_1$ to $C_4$-alkylmercapto, $C_1$ to $C_4$-alkylsulphonyl, phenylsulphonyl, benzylsulphonyl, carboxyl, $C_1$ to $C_4$-alkoxycarbonyl, carboxy-$C_1$ to $C_4$-alkyl, phthalimido-$C_1$ or $C_2$-alkyl or the radical of a fused 5-membered or 6-membered carbocyclic or heterocyclic ring,
a denotes the numbers 0, 1 or 2,
b denotes the numbers 0, 1 or 2,
$B_1$ denotes an aryl radical which can be fused to 5-membered or 6-membered hetero-rings and
$An^{(-)}$ denotes an anion and
the alkyl, alkenyl, alkinyl, aralkyl, aryl, cycloalkyl and heterocyclic radicals can be substituted by non-ionic substituents.

Particularly preferred dyestuffs are those of the general formula

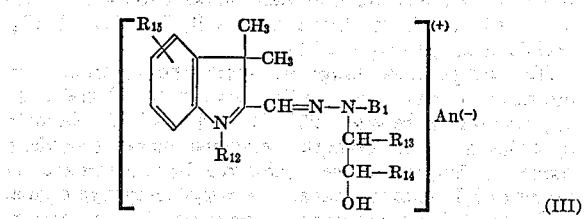

(III)

wherein
$R_{12}$ denotes methyl, ethyl, n-propyl, isopropyl or n-butyl, octadecyl, phenyl, benzyl, p-nitrobenzyl, phenethyl or p-nitrophenethyl or a radical of the formula

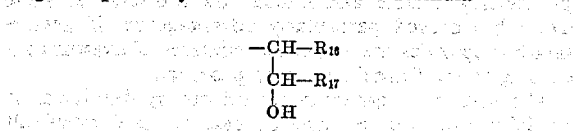

$R_{13}$ denotes hydrogen, methyl, ethyl, n-propyl, allyloxymethyl or phenoxymethyl,
$R_{14}$ denotes hydrogen, methyl, ethyl, n-propyl, allyloxymethyl or phenoxymethyl, with at least one of the radicals $R_{13}$ or $R_{14}$ being hydrogen, methyl or ethyl,
$R_{15}$ denotes hydrogen or one or more radicals such as fluorine, chlorine, bromine, nitrile, nitro, sulphamoyl, amino, dimethylamino, diethylamino, methyl, ethyl, n-propyl, dodecyl, methoxy, ethoxy, n-propoxy, n-butoxy, phenoxy, benzyloxy, methylmercapto, ethylmercapto, methylsulphonyl, ethylsulphonyl, phenyl, p-nitrophenyl, benzyl, 4-methoxybenzyl, cyclohexyl, cyclopentyl, trifluoromethyl, trichloromethyl, carboxy, carboxymethyl, carboxyethyl, carbomethoxy, carboethoxy, phthalimidomethyl or the residual part of a fused carbocyclic 6-membered ring which can in turn be substituted by chlorine, bromine, nitrile, nitro, methyl or methoxy,
$R_{16}$ denotes hydrogen, methyl, ethyl, n-propyl, isopropyl, n-butyl, n-pentyl, isobutyl, n-hexyl, isohexyl, n-octyl, isooctyl, n-nonyl, isononyl, n-decyl, isodecyl, n-dodecyl, n-hexadecyl, n-octadecyl, chloromethyl, β-chloroethyl, vinyl, allyl, ethinyl, propargyl, phenyl, benzyl, methoxymethyl, ethoxymethyl, n-propoxymethyl, isopropoxymethyl, n-butoxymethyl, isobutoxymethyl, n-hexyloxymethyl, n-octyloxymethyl, n-decyloxymethyl, n-nonyloxymethyl, n-dodecyloxymethyl, allyloxymethyl, methallyloxymethyl, crotyloxymethyl, propargyloxymethyl, phenoxymethyl or 4-methoxyphenoxymethyl,
$R_{17}$ denotes hydrogen, methyl, ethyl, n-propyl, isopropyl, n-butyl, n-pentyl, isobutyl, n-hexyl, isohexyl, n-octyl, isooctyl, n-nonyl, isononyl, n-decyl, isodecyl, n-dodecyl, n-hexadecyl, n-octadecyl, chloromethyl, β-chloroethyl, vinyl, allyl, ethinyl, propargyl, phenyl, benzyl, methoxymethyl, ethoxymethyl, n-propoxymethyl, isopropoxymethyl, n-butoxymethyl, isobutoxymethyl, n-hexyloxymethyl, n-octyloxymethyl, n-decyloxymethyl, n-nonyloxymethyl, n-dodecyloxymethyl, allyloxymethyl, methallyloxymethyl, crotyloxymethyl, propargyloxymethyl, phenoxymethyl or 4-methoxyphenoxymethyl, with at least one of the radicals $R_{16}$ or $R_{17}$ being hydrogen, methyl or ethyl,
$B_1$ denotes an aryl radical which can be substituted by 5-membered or 6-membered hetero-rings, with nonionic substituents being optionally present in the aryl radical and the hetero-rings, and
$An^{(-)}$ denotes an anion.

Amongst these compounds, the dyestuffs of the formulae IV, V and VI should be singled out:

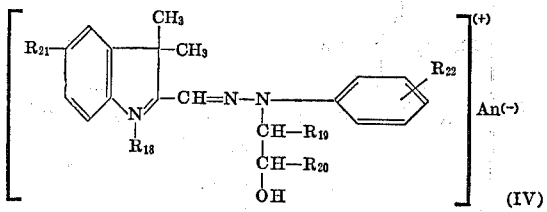

(IV)

wherein
$R_{18}$ denotes methyl or ethyl,
$R_{19}$ denotes hydrogen, methyl or ethyl,
$R_{20}$ denotes hydrogen, methyl or ethyl,
$R_{21}$ denotes hydrogen, chlorine, methyl, methoxy, ethoxy, benzyloxy, carboxy, carbomethoxy or carboethoxy,
$R_{22}$ denotes hydrogen or one or more radicals such as methyl, methoxy, ethoxy, i-propoxy, benzyl or together with the phenyl ring denotes a naphthyl, carbazolyl or diphenylene oxide radical and
$An^{(-)}$ denotes an anion;

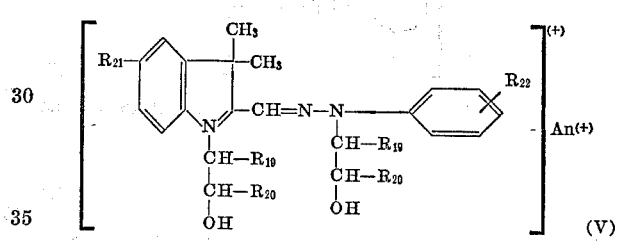

(V)

wherein
the radicals $R_{19}$ to $R_{22}$ and $An^{(-)}$ have the meaning indicated in the formula IV, and

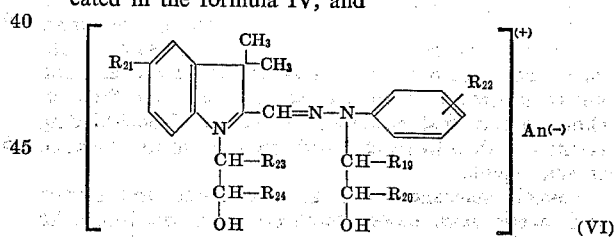

(VI)

wherein
the radicals $R_{19}$ to $R_{22}$ and $An^{(-)}$ have the meaning indicated in the formula IV and
$R_{23}$ denotes hydrogen, methyl, ethyl or allyloxymethyl and
$R_{24}$ denotes hydrogen, methyl, ethyl, and allyloxymethyl.

A further preferred group within the dyestuffs I according to the invention are those of the general formula

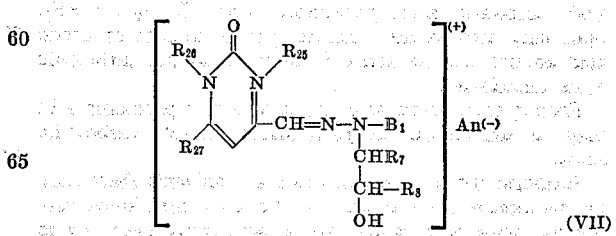

(VII)

wherein
$R_{25}$ denotes methyl, ethyl, n-propyl, n-butyl, cyclohexyl, phenyl, p-chlorophenyl or p-methylphenyl,
$R_{26}$ denotes methyl, ethyl, n-propyl, n-butyl, cyclohexyl, phenyl, p-chlorophenyl or p-methylphenyl,
$R_{27}$ denotes hydrogen, methyl, phenyl, p-chlorophenyl or p-methylphenyl and $R_7$, $R_8$, $B_1$ and $An^{(-)}$ have the meaning indicated in the formula II.

Amongst these, particularly preferred dyestuffs are those of the general formula

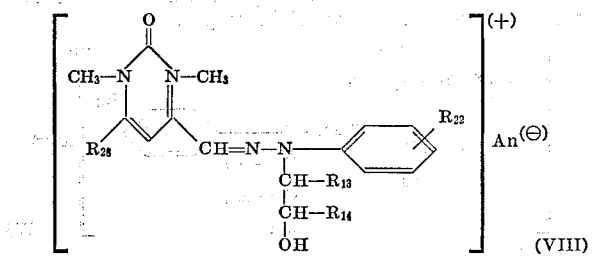

wherein $R_{28}$ denotes hydrogen, methyl or phenyl and the radicals $R_{13}$, $R_{14}$, $R_{22}$ and $An^{(-)}$ have the meaning indicated in the formulae III or IV.

It has been found, surprisingly, that the dyestuffs according to the invention can be manufactured in a simple manner if salts of acids HAn with azo bases of the formula

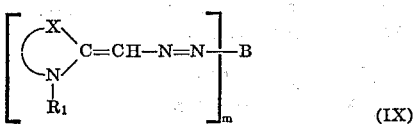

are reacted in an acid medium with epoxides of the formula

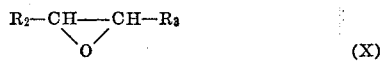

In the formulae IX and X the symbols have the meaning indicated in the formula I.

Possible salts of azo bases are the salts which arise during diazotisation and coupling in accordance with known processes, as well as the salts obtained therefrom by anion exchange, for example in the course of working-up and isolation. It is however also possible, using known processes, to liberate the azo base from the coupling product first produced by means of acid-binding agents and then to react it with epoxides in the presence of acid agents.

Possible substances with an acid action are: formic acid, acetic acid, monochloroacetic acid, dichloroacetic acid, trichloroacetic acid, propionic acid, β-chloropropionic acid, butyric acid, succinic acid, malonic acid, glutaric acid, lactic acid or benzoic acid. The acids can be used individually or as mixtures or conjointly with solvents such as water, benzene, chlorobenzene, acetone or chloroform, dioxane, acetic acid ethyl ester, acetic acid glycol monoester, acetic acid glycol diester, acetic acid polyglycol monoester and diester, acetic acid methyl ester or sterically hindered alcohols, such as tert.-butanol. As acid constituents, inorganic compounds such as hydrochloric acid, sulphuric acid, phosphoric acid, $ZnCl_2$ or $BF_3$, optionally also as the etherate, phenol adduct or acetic acid adduct, can be added in addition to the carboxylic acids mentioned.

Formic acid, acetic acid, lactic acid and propionic acid may be singled out as particularly suitable carboxylic acids.

Amongst the mixtures of acids and solvents there may be mentioned the mixtures of the abovementioned carboxylic acids with water, acetic acid ethyl ester, acetic acid glycol monoester, acetic acid β-methylglycol monoester, acetic acid diglycol-ether monoester and diester, acetic acid polyglycol-ether monoester and diester, acetic acid di-(β-methylglycol)-ether monoester and diester, acetic acid poly-(β-methylglycol)-ether monester and diester, monoacetic, diacetic and triacetic acid esters of glycerine and mixtures thereof. Further suitable mixtures to be mentioned are those of the abovementioned carboxylic acids, their methyl and ethyl esters and their monoesters and diesters with glycol, diglycol-ether or polyglycol-ether, with chlorobenzene.

A particularly preferred embodiment is the reaction in anhydrous carboxylic acids, optionally in the presence of acid inorganic components, such as can for example arise if in place of the free azo base a salt of the azo base and an inorganic acid is employed. The inorganic component can also be added directly. Particularly suitable carboxylic acids for the anhydrous alkylation are formic acid, acetic acid, lactic acid and propionic acid. Possible inorganic components, optionally bonded to the azo base as a salt are: hydrochloric acid, HB, HF, HI, $H_2SO_4$, $H_3PO_4$, $ZnCl_2$, $ZnBr_2$ and $BF_3$.

The temperature range in which the reaction with epoxides can be carried out lies between 20° C. and 200° C., preferably between 60° C. and 120° C. Suitable epoxides are, for example: ethylene oxide, propylene oxide, 1,2-butylene oxide, 1-chloro-2,3-epoxypropane, 1-methoxy-2,3-epoxypropane, 1-ethoxy-2,3-epoxypropane, 1-allyloxy-2,3-epoxypropane, 1-phenoxy-2,3-epoxypropane, 3,4-epoxybutene-1, 3,4-epoxypentene-1, cis-epoxysuccinic acid and 2,3-epoxybutyric acid alkyl esters. Amongst these, ethylene oxide and propylene oxide are particularly suitable, and amongst the two latter ethylene oxide has proved particularly advantageous. If unsymmetrical epoxides are employed, mixtures of dyestuffs according to the formula I can be produced.

The reaction is generally carried out by dissolving, or partially dissolving, the dyestuff base or the dyestuff salt in the abovementioned solvent or solvent mixture. After reaching the desired reaction temperature, the epoxide is added. It can be in the form of a gas or liquid. In small batches, the epoxide can be introduced in the form of a gas, without use of pressure. On an industrial scale, the reaction is preferably carried out under slightly elevated pressure (0.2–2 atmospheres gauge). At low temperatures, particularly, it is necessary to watch for complete reaction of the epoxide already during the addition. In the case of sensitive dyestuffs, or if the dyestuff salts show particular solution behavior, the epoxide and the carboxylic acid can be added simultaneously. The epoxide is frequently, like the carboxylic acid, added in a molar excess, since it can be assumed that side-reactions with the carboxylic acids will occur. The glycol esters which may be produced are good solvents, so that their formation does not cause any problem and may even be desirable in the case of liquids. The end of the reaction is detected by the customary test of solubility properties and by analytical methods, especially by chromatography.

Salts of azo bases of the formula IX can be manufactued in accordance with various methods. For example, the compounds

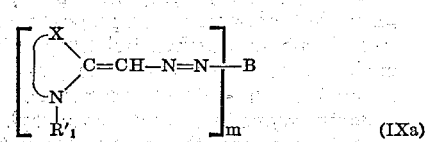

wherein $R'_1$ denotes alkyl, aralkyl, aryl or cycloalkyl and X, B and m have the meaning indicated in the formula IX, are manufactured by coupling a methylene base of the formula

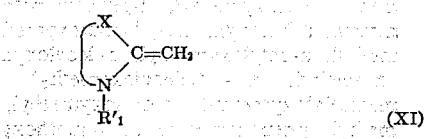

or its salts, in accordance with known methods, with diazonium salts of suitable amines. The free azo bases can be obtained from the resulting coupling products in accordance with methods which are also known, by treatment with acid-binding agents.

Suitable coupling components of the formula XI are, for example:

1,3,3-trimethyl-2-methylene-2,3-dihydroindole,
1,3,3,5-tetramethyl-2-methylene-2,3-dihydroindole,
1,3,3-trimethyl-5-chloro-2-methylene-2,3-dihydroindole,
1,3,3-trimethyl-5-fluoro-2-methylene-2,3-dihydroindole,
1,3,3-trimethyl-5-methoxy-2-methylene-2,3-dihydroindole,
1,3,3-trimethyl-5-ethoxy-2-methylene-2,3-dihydroindole,
1,3,3-trimethyl-5-carbomethoxy-2-methylene-2,3-dihydroindole,
1,3,3-trimethyl-5-cyano-2-methylene-2,3-dihydroindole,
1,3,3-trimethyl-5-nitro-2-methylene-2,3-dihydroindole,
1,3,3-trimethyl-6-chloro-2-methylene-2,3-dihydroindole,
1,3,3-trimethyl-7-methyl-2-methylene-2,3-dihydroindole,
1,3,3-trimethyl-7-chloro-2-methylene-2,3-dihydroindole,
1,3,3-trimethyl-5-trifluoromethyl-2-methylene-2,3-dihydroindole,
1,3,3-trimethyl-7-methoxy-2-methylene-2,3-dihydroindole,
1,3,3-trimethyl-7-chloro-2-methylene-2,3-dihydroindole,
1-ethyl-3,3-dimethyl-2-methylene-2,3-dihydroindole,
1-ethyl-3,3,5-trimethyl-2-methylene-2,3-dihydroindole,
1-ethyl-3,3-dimethyl-5-chloro-2-methylene-2,3-dihydroindole,
1-ethyl-3,3-dimethyl-5-methoxy-2-methylene-2,3-dihydroindole,
1-ethyl-3,3-dimethyl-5-carbomethoxy-2-methylene-2,3-dihydroindole,
1-ethyl-3,3-dimethyl-5-carboethoxy-2-methylene-2,3-dihydroindole,
1-ethyl-3,3-dimethyl-5-nitro-2-methylene-2,3-dihydroindole,
1,3,3-triethyl-2-methylene-2,3-dihydroindole,
1-phenyl-3,3-dimethyl-2-methylene-2,3-dihydroindole,
1,3-dimethyl-4-methylenedihydropyrimidone-(2),
1,3,6-trimethyl-4-methylenedihydropyrimidone-(2),
1-methyl-3-ethyl-4-methylenedihydropyrimidone-(2),
1,3-diethyl-4-methylenedihydropyrimidone-(2),
1,3-dimethyl-6-phenyl-4-methylene-dihydropyrimidone-(2),
1,3-diethyl-6-phenyl-4-methylene-dihydropyrimidone-(2),
1-methyl-2-methylenebenzothiazoline,
1,7-dimethyl-5-chloro-2-methylene-benzothiazoline,
1,3-dimethyl-2-methylene-dihydro-(1,2)-quinoxaline,
1-phenyl-3-methyl-2-methylene-dihydro-(1,2)-quinoxaline,
1,4-dimethyl-2-methylene-dihydro-1,2)-quinoxalone-(3),
1-methyl-4-n-propyl-2-methylene-dihydro-(1,2)-quinoxalone-(3),
3-methyl-4-methylene-dihydro-(3,4)-quinazolone-(2),
1,3-dimethyl-4-methylene-dihydro-(3,4)-quinazolone-(2) and
1,3-dimethyl-6-methoxy- or
-6-ethoxy-4-methylene-dihydro-(3,4-quinazolone-(2).

Possible amine components are:

aniline,
p-toluidine,
m-toluidine,
p-anisidine,
m-anisidine,
o-anisidine,
p-phenetidine,
o-phenetidine,
4-aminoacetanilide,
3-aminoacetanilide,
N-benzoyl-phenylenediamine,
5-amino-2-acetylaminoanisole,
4-amino-2,5-diethoxybenzoic acid anilide,
4-amino-2-methyl-5-methoxybenzamide,
1-amino-4-ethylbenzene,
1-amino-4-tert.-butylbenzene,
2,4,5-trimethylaniline,
2,3,5-trimethylaniline,
2-aminobenzoic acid,
3-aminobenzoic acid,
3-aminophenylpropionic acid,
4-aminobenzoic acid,
6-amino-3-methoxytoluene,
1-amino-3-chloro-4-methoxybenzene,
1-amino-2,4-dimethoxybenzene,
1-amino-2,5-dimethoxybenzene,
1-amino-2,5-diethoxybenzene,
1-amino-2,4-diethoxybenzene,
1-amino-3,4-dimethoxybenzene,
1-amino-3,4-diethoxybenzene,
1-amino-3,4-dipropoxybenzene,
2-chloro-4-aminoanisole,
3,4-dicyanoaniline,
4-aminoazobenzene,
4-aminoazotoluene,
dehydrothiotoluidine,
4-chloroaniline,
2,4-dichloroaniline,
2,4-dimethoxy-5-chloroaniline,
4-aminodiphenylmethane,
4-amino-diphenylethane-(1,2),
4-amino-4'-nitrodiphenylmethane,
4-amino-4'-methyldiphenylmethane,
4-amino-4'-benzyldiphenylmethane,
4,4'-diaminodiphenylmethane,
4-amino-4'-dimethylaminodiphenylmethane,
4-amino-4'-bis-(β-hydroxyethyl-amino)-diphenylmethane,
4-amino-4'-acetylaminodiphenylmethane,
4-amino-4'-hydroxydiphenylmethane,
4-amino-4'-(β-hydroxyethoxy)-diphenylmethane,
4-amino-4'-methoxydiphenylmethane,
4-dodecylaniline,
1,2,3,4-tetrahydro-5-aminonaphthalene,
4-cyclohexylaniline,
2-methyl-4-cyclohexylaniline,
1-aminonaphthalene,
4-amino-diphenylether,
4-amino-4'-methyldiphenyl-ether,
4-aminophenylbenzylether,
4-aminophenyl-2-naphthyl-ether,
4-amino-diphenylsulphide,
4-aminophenylbenzylsulphide,
3-aminophenylbenzyl-ether,
4-aminophenyl-p-chlorobenzyl-ether,
4-amino-N-methyldiphenylamine,
4,4'-diaminodiphenylethane,
4-amino-4'-ethoxy-N-methyldiphenylamine,
4-amino-4'-methyl-N-methyldiphenylamine,
4-amino-N-ethyldiphenylamine,
3-amino-N-methyldiphenylamine,
4-amino-diphenylsulphone,
4-aminodibenzylsulphone,
(4-aminophenyl)-benzyl-sulphone,
1-amino-4-methylmercaptobenzene,
1-amino-4-methylsulphonylbenzene,
1-amino-3,4-diisopropoxybenzene,
2-aminocarbazole,
3-aminocarbazole,
2-amino-9-methylcarbazole,
3-amino-9-methylcarbazole,
3-amino-9-ethylcarbazole,
3-amino-9-n-propylcarbazole,
3-amino-9-n-butyl-carbazole,
3-amino-9-(p-aminophenyl)-carbazole,
3-amino-6-chlorocarbazole,
1-amino-9-methyl-3,6-dibromocarbazole,
2-amino-1-methoxydiphenylenesulphide,
3-amino-diphenylenesulphide,
3-amino-2-bromodiphenylenesulphide,
3-amino-1-ethoxy-6-methyldiphenylenesulphide, 3-amino-1-bromo-6-methyldiphenylenesulphide,
3-amino-6-ethoxydiphenylenesulphide,
4-aminodiphenylenesulphide,
3-amino-6-acetaminodiphenylene oxide,
6-amino-3-bromo-diphenylene oxide,
7-amino-3-chlorodiphenylene oxide,
3-amino-7-chloro-diphenylene oxide,
2-amino-6-chloro-diphenylene oxide,
2-amino-6-bromo-diphenylene oxide,
2-amino-diphenylene oxide,
3-aminodiphenylene oxide,
3-amino-2-methyldiphenylene oxide,
3-amino-2-ethyldiphenylene oxide,
2-amino-3-methoxydiphenylene oxide,
2-amino-3-ethoxydiphenylene oxide,
7-amino-1,2,3,4-tetrahydrodiphenylene oxide,
8-amino-1,2,3,4,10,11-hexahydrodiphenylene oxide,
6-amino-9-methyl-1,2,3,4-tetrahydrocarbazole,
6-amino-9-methyl-1,2,3,4-tetrahydrocarbazole,
6-amino-3-methyl-1,2,3,4-tetrahydrocarbazole,
7-amino-3-methyl-1,2,3,4-tetrahydrocarbazole,
5-amino-8-chloro-1,2,3,4-tetrahydrocarbazole,
7-amino-6-ethoxy-1,2,34-tetrahydrocarbazole,
7-amino-9-ethyl-1,2,3,4-tetrahydrocarbazole,
6-amino-9-ethyl-1,2,3,4-tetrahydrocarbazole and
7-amino-8-chloro-1,2,3,4,10,11-hexahydrocarbazole.

Azo bases of the formula

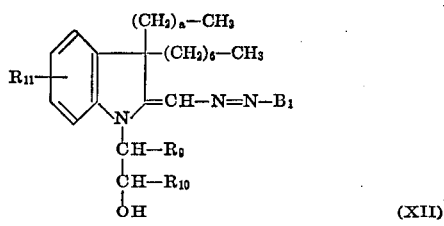

(XII)

wherein the symbols have the meaning indicated in the formula II, can be manufactured if, for example, the 9a-methyl-2,3,9,9a-tetrahydrooxazolo-[3,2a]-indoles obtainable according to German patent applications P 20 64 881.1 are coupled with diazonium salts and the azo base is liberated from the coupling product by means of acid-binding agents, such as alkali.

Suitable coupling components for the manufacture of compounds of the formula XI are, for example:

9,9,9a-trimethyl-2,3,9,9a-tetrahydro-oxazolo[3,2a]-indole,
7,9,9,9a-tetramethyl-2,3,9,9a-tetrahydro-oxoazolo-[3,2a]-indole
7-chloro-9,9,9a-trimethyl-2,3,9,9a-tetrahydro-oxazolo-[3,2a]-indole,
7-methoxy-9,9,9a-trimethyl-2,3,9,9a-tetrahydro-oxazolo-[3,2a]-indole,
7-ethyl-9,9,9a-trimethyl-2,3,9,9a-tetrahydro-oxazolo-[3,2a]-indole,
7-cyclohexyl-9,9,9a-trimethyl-2,3,9,9a-tetrahydro-oxazolo-[3,2a]-indole,
7-trifluoromethyl-9,9,9a-trimethyl-2,3,9,9a-tetrahydro-oxazolo-[3,2a]-indole,
7-acetamino-9,9,9a-trimethyl-2,3,9,9a-tetrahydro-oxazolo-[3,2a]-indole,
7-cyclohexyl-5,9,9,9a-tetramethyl-2,3,9,9a-tetrahydro-oxazolo-[3,2a]-indole,
9,9-diethyl-9a-methyl-2,3,9,9a-tetrahydro-oxazolo-[3,2a]-indole,
9,9-diethyl-7,9a-dimethyl-2,3,9,9a-tetrahydro-oxazolo-[3,2a]-indole,
9,9-diethyl-7-chloro-9a-methyl-2,3,9,9a-tetrahydro-oxazolo-[3,2a]-indole,
2,9,9,9a-tetramethyl-2,3,9,9a-tetrahydro-oxazolo-[3,2a]-indole,
3,9,9,9a-tetramethyl-2,3,9,9a-tetrahydro-oxazolo-[3,2a]-indole,
9,9,9a-trimethyl-2-phenoxy-2,3,9,9a-tetrahydro-oxazolo-[3,2a]-indole,
9,9,9a-trimethyl-2-phenoxymethyl-2,3,9,9a-tetrahydro-oxazolo-[3,2a]-indole,
9,9,9a-trimethyl-7-methoxy-2-phenoxymethyl-2,3,9,9a-tetrahydro-oxazolo-[3,2a]-indole,
9,9-diethyl-9a-methyl-2-phenoxymethyl-2,3,9,9a-tetra-oxazolo-[3,2a]-indole,
9,9,9a-trimethyl-2-chloromethyl-2,3,9,9a-tetrahydro-oxazolo-[3,2a]-indole,
9,9,9a-trimethyl-3-chloromethyl-2,3,9,9a-tetrahydro-oxazolo-[3,2a]-indole,
9,9,9a-trimethyl-2-ethyl-2,3,9,9a-tetrahydrooxazolo-[3,2a]-indole,
9,9,9a-trimethyl-7-phthalimidomethyl-2,3,9,9a-tetrahydro-oxazolo-[3,2a]-indole,
9,9,9a-trimethyl-7-cyano-2,3,9,9a-tetrahydro-oxazolo-[3,2a]-indole,
2,9,9,9a-tetramethyl-7-cyano-2,3,9,9a-tetrahydro-oxazolo-[3,2a]-indole,
2,3,9,9,9a-pentamethyl-2,3,9,9a-tetrahydro-oxazolo-[3,2a]-indole,
9,9,9a-trimethyl-2-methoxymethyl-2,3,9,9a-tetrahydro-oxazolo-[3,2a]-indole,
5,6-benzo-9,9,9a-trimethyl-2,3,9,9a-tetrahydro-oxazolo-[3,2a]-indole,
6,7-benzo-9,9,9a-trimethyl-2,3,9,9a-tetrahydro-oxazolo-[3,2a]-indole,
6-chloro-9,9,9a-trimethyl-2,3,9,9a-tetrahydro-oxazolo-[3,2a]-indole,
5-chloro-9,9,9a-trimethyl-2,3,9,9a-tetrahydro-oxazolo-[3,2a]-indole,
7-fluoro-9,9,9a-trimethyl-2,3,9,9a-tetrahydro-oxazolo-[3,2a]-indole,
7-carboxy-9,9,9a-trimethyl-2,3,9,9a-tetrahydro-oxazolo-[3,2a]-indole,
7-(carbo-β-oxyethoxy)-9,9,9a-trimethyl-2,3,9,9a-tetrahydro-oxazolo-[3,2a]-indole,
7-carboxy-2-phenoxymethyl-9,9,9a-trimethyl-2,3,9,9a-tetrahydrooxazolo-[3,2a]-indole,
7-carboxy-3-phenoxymethyl-9,9,9a-trimethyl-2,3,9,9a-tetrahydro-oxazolo-[3,2a]-indole,
7-ethoxy-9,9,9a-trimethyl-2,3,9,9a-tetrahydro-oxazolo-[3,2a]-indole,
9,9,9a-trimethyl-2-ethoxymethyl-2,3,9,9a-tetrahydro-oxazolo-[3,2a]-indole,
9,9,9a-trimethyl-2-(n-propoxymethyl)-2,3,9,9a-tetrahydro-oxazolo-[3,2a]-indole,
9,9,9a-trimethyl-2-(n-hexyloxymethyl)-2,3,9,9a-tetrahydro-oxazolo-[3,2a]-indole,
9,9,9a-trimethyl-3-methoxymethyl-2,3,9,9a-tetrahydro-oxazolo-[3,2a]-indole,
9,9,9a-trimethyl-3-ethoxymethyl-2,3,9,9a-tetrahydro-oxazolo-[3,2a]-indole,
9,9,9a-trimethyl-3-(n-hexyloxymethyl)-2,3,9,9a-tetrahydro-oxazolo-[3,2a]indole,
7,9,9,9a-tetramethyl-2-phenoxymethyl-2,3,9,9a-tetrahydro-oxazolo-[3,2a]-indole,
7-chloro-9,9,9a-trimethyl-2-phenoxymethyl-2,3,9,9a-tetrahydro-oxazolo-[3,2a]-indole,
7-fluoro-9,9,9a-trimethyl-2-phenoxymethyl-2,3,9,9a-tetrahydro-oxazolo-[3,2a]-indole,
7-chloro-9,9,9a-trimethyl-2-methoxymethyl-2,3,9,9a-tetrahydro-oxazolo-[3,2a]-indole,
7-chloro-9,9,9a-trimethyl-2-ethoxy-methyl-2,3,9,9a-tetrahydro-oxazolo-[3,2a]-indole,
7-chloro-9,9,9a-trimethyl-2-(n-hexyloxymethyl)-2,3,9,9a-tetrahydro-oxazolo-[3,2a]-indole,
7-chloro-9,9,9a-trimethyl-2-(n-propoxymethyl)-2,3,9,9a-tetrahydro-oxazolo-[3,2a]-indole, 7-chloro-6-fluoro-9,9,9a-trimethyl-2,3,9,9a-tetrahydro-oxazolo-[3,2a]-indole,
7-phenyl-9,9,9a-trimethyl-2,3,9,9a-tetrahydro-oxazolo-[3,2a]-indole,
7-chloro-2-phenoxymethyl-9,9,9a-trimethyl-2,3,9,9a-tetrahydro-oxazolo-[3,2a]-indole and
7,9,9,9a-tetramethyl-2-phenoxymethyl-2,3,9,9a-tetrahydro-oxazolo-[3,2a]-indole.

It was furthermore found, surprisingly, that in order to manufacture dyestuffs of the formula

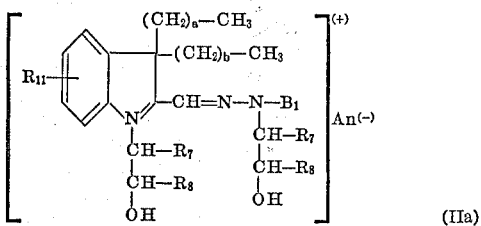

(IIa)

it is also possible to react azo bases of indolenines of the formula

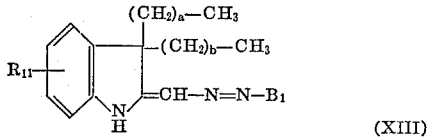

(XIII)

or salts of these azo bases, in an acid medium, with epoxides of the formula

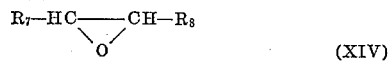

(XIV)

In the formulae IIa, XIII and XIV the symbols have the meaning indicated in the formula II.

The compounds of the formula XIII can be obtained according to methods which are in themselves known, by coupling indolenines with diazonium salts and liberating the azo base from the coupling product by means of acid-binding agents, such as alkali.

The temperature range in which the reaciton with epoxides can be carried out is between 20° C. and 200° C., preferably between 60° C. and 120° C. As solvents or acids, it is possible to use the substances indicated in connection with the epoxidation of the compound IX.

Examples of suitable coupling components for the manufacture of compounds of the formula XIII are:

2,3,3,trimethyl-indolenine,
2-methyl-3,3-diethylindolenine,
2,3,3,5-tetramethylindolenine,
2,3,3-trimethyl-5-chloro-indolenine,
2,3,3-trimethyl-5-carboxy-indolenine,
2,3,3-trimethyl-5-cyclohexyl-indolenine,
2,3,3,7-tetramethyl-5-cyclohexyl-indolenine,
2,3,3-trimethyl-5-trifluoromethyl-indolenine,
2,3,3-trimethyl-5-methoxyindolenine,
2,3,3-trimethyl-5-sulphamoylindolenine,
2,3,3-trimethyl-5-phthalimidomethyl-indolenine,
2,5-dimethyl-3,3-diethylindolenine,
2-methyl-5-chloro-3,3-diethylindolenine,
2,3,3-trimethyl-5,6-benzoindolenine,
2,3,3-trimethyl-5-ethoxy-indolenine,
2,3,3-trimethyl-5-butoxy-indolenine,
2-methyl-3,3-diethyl-5-methoxyindolenine,
2-methyl-3,3-diethyl-5-carboxy-indolenine,
2-methyl-3,3-diethyl-5-carbomethoxyindolenine,
2-methyl-3,3-diethyl-5-carboethoxyindolenine,
2,3,3-trimethyl-6-chloroindolenine,
2,3,3-trimethyl-7-chloroindolenine,
2,3,3-trimethyl-5-fluoroindolenine,
2,3,3-trimethyl-5-carbomethoxyindolenine,
2,3,3-trimethyl-5-ethylindolenine,
2,3,3-trimethyl-5-dodecylindolenine,
2,3,3-trimethyl-5-n-butylindolenine,
2,3,3-trimethyl-5-n-propylindolenine,
2,3,3-trimethyl-5-benzylindolenine,
2-methyl-3,3,5-triethylindolenine,
2-methyl-3,3-diethyl-5-n-propylindolenine,
2-methyl-3,3-diethyl-5-dodecylindolenine,
2,3,3-trimethyl-5-chloro-6-phthalimidomethylindolenine,
2,3,3,5-tetramethyl-6-phthalimidomethylindolenine,
2,3,3-trimethyl-5-hexahydro-phthalimidomethylindolenine,
2,3,3-trimethyl-5-cyanoindolenine,
5-chloro-6-fluoro-2,3,3-trimethylindolenine,
2,3,3-trimethyl-6,7-benzoindolenine,
2,3,3-trimethyl-4,5-benzoindolenine,
2,3,3-trimethyl-5-methylmercapto-indolenine,
2,3,3-trimethyl-5-methylsulphonylindolenine, and
2,3,3-trimethyl-5-acetylaminoindolenine.

Possible amine components for the manufacture of compounds of the formulae XII and XIII are the amines mentioned for the manufacture of the compounds IXa.

The dyestuffs according to the invention as a rule remain in solution in the reaction medium. They can also be isolated in accordance with known methods, such as distilling off the solvent or other volatile components, salting-out or precipitation. It should be mentioned as being particularly advantageous that following the method according to the invention the dyestuff is obtained, for example in the case of epoxidations in formic acid, acetic acid, lactic acid or propionic acid, in a solvent which is partially or wholly miscible with organic solvents or with water and which can be used directly for dyeing. The water-miscible solutions which are obtained by reaction of azo bases or their salts with ethylene oxide or propylene oxide in formic acid, acetic acid, lactic acid or propionic acid, and the dyestuff content of which is advantageously between 5 and 50 percent by weight, should here be singled out particularly. The solutions can also be used whilst employing additives which are in themselves known and methods, which are in themselves known, for dyeing in organic solvents, such as trichloroethylene or perchloroethylene.

Because of their good solubility the dyestuffs according to the invention are particularly suitable for the manufacture of liquid formulations.

The ready-to-use solutions of the dyestuffs can also be obtained advantageously if the solvents present during the reaction, such as ethyl acetate, chloroform, benzene or chlorobenzene are distilled off for re-use and the dyestuff solutions are replaced by other solvents which are used for the manufacture of liquid dyestuffs. Water, lower alcohols, glycols and glycol ethers, for example methanol, ethanol, n-propanol, isopropanol, glycol, propylene glycol, diethylene glycol and triethylene glycol should be particularly mentioned in this context.

The compounds of the general formulae I to VIII are valuable dyestuffs which are in particular suitable for dyeing flocks, fibres, filaments, tapes, woven fabrics or knitted fabrics of polyacrylonitrile or of copolymers of acrylonitrile with other vinyl compounds, such as vinyl chloride, vinylidene chloride, vinyl fluoride, vinyl acetate, vinyl alcohol, acrylic and methacrylic acid esters and amides and asymmetrical dicyanoethylene, or flocks, fibres, filaments, tapes, woven fabrics or knitted fabrics of acid-modified aromatic polyesters. Acid-modified aromatic polyesters are, for example, polycondensation products of sulphoterephthalic acid and ethylene glycol, that is to say polyethylene glycol terephthalates containing sulphonic acid groups (type Dacron 64 of E. I. du Pont de Nemours and Company), such as described in Belgian patent specification 549,179 and U.S. patent specification 2,893,816. The dyestuffs are furthermore suitable for dyeing acid-modified polyamide.

Dyeing can also be effected from a weakly acid liquor, in which case the material is suitably introduced into the dyebath at 40–60° C. and then dyed at the boil. Furthermore, the dyestuffs can be added to spinning solutions for the manufacture of fibres containing polyacrylonitrile or be applied to the unstretched fibre or wet-spun fibre. The dyeings on material containing acrylonitrile are distinguished by very good fastness to light, wet processing, rubbing and sublimation. The good levelling capacity of the dyestuffs generaly makes it possible to dispense with the use of retarders.

The dyestuffs are furthermore suitable for dyeing and printing materials of leather, tannin-treated cotton, cellulose, synthetic polyamides and polyurethanes and lignin-containing fibres, such as coir, jute and sisal. They are furthermore suitable for the manufacture of writing fluids, inks for rubber stamps and ball-pen pastes and can also be used in flexographic printing.

With anionic precipitants such as alumina, tannin, phosphotungstic and phosphomolybdic acid the dyestuffs form light-fast pigments which can be employed with advantage in paper printing.

EXAMPLE 1

Ethylene oxide is passed for 8 hours at 100° through a solution, in 200 g. of glacial acetic acid, of 10 g. of the azo base hydrochloride obtained by coupling 1,3,3-trimethyl - 2 - methylene-2,3-dihydroindole with diazotized 4-aminodiphenylmethane. The resulting solution of the dyestuff of the composition

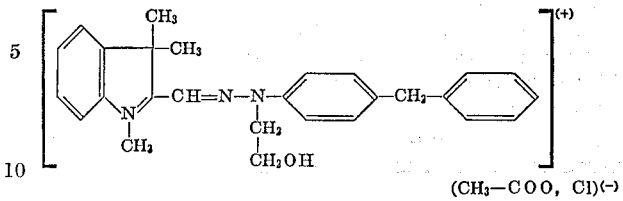

in aqueous liquors dyes fabrics of polyacrylonitrile in yellow shades of good fastness to light and wet processing.

If half the dyestuff solution is introduced into 400 ml. of water and rendered alkaline with sodium hydroxide solution, and the oil which has separated out is taken up in benzene/ligroin, and the benzene/ligroin phase is stirred with approx. 15% strength aqueous hydrochloric acid, 4.3 g. of the chloride of the above-mentioned dyestuff precipitate as yellow crystals which are recrystallized from water in the presence of charcoal. The chloride thus obtained also dyes fabrics of polyacrylonitrile in yellow shades of good fastness to light and to wet processing.

If the components mentioned in the table are used as indicated in Example 1, dyestuffs or dyestuff solutions are obtained which dye polyacrylonitrile in the color shades given below.

| Amine component | Methylene component | Epoxide | Anion | Color shade |
|---|---|---|---|---|
| Aniline | 1,3,3-trimethyl-2-methylene-2,3-dihydroindole | Ethylene oxide | Formate | Yellow. |
| Do | 1,3,3-trimethyl-5-chloro-2-methylene-2,3-dihydroindole | do | Acetate | Do. |
| p-Toluidine | do | do | do | Do. |
| p-Anisidine | do | do | do | Reddish-tinged yellow. |
| p-Phenetidine | do | do | do | Do. |
| Do | 1,3,3-trimethyl-2-methylene-2,3-dihydroindole | do | Formate | Do. |
| 1,2,3,4-tetrahydro-5-amino-naphthalene | do | do | Cl$^{(-)}$ | Yellow. |
| 1-aminonaphthalene | do | do | HSO$_4^{(-)}$ | Do. |
| 4-aminodiphenyl-ether | do | do | HSO$_4^{(-)}$ | Reddish-tinged yellow. |
| 4-aminodiphenylsulphide | do | do | Propionate | Yellow. |
| 4-amino-N-methyldiphenyl-methane | do | do | do | Yellowish-tinged red. |
| 1-amino-5-benzyloxynaphthalene | do | do | do | Reddish-tinged yellow. |
| 4-aminodiphenylsulphone | do | do | do | Yellow. |
| 4-aminodibenzylsulphone | do | do | do | Do. |
| 3-aminodiphenylenesulphide | do | Propylene oxide | Lactate | Do. |
| 3-aminodiphenylene oxide | do | do | do | Reddish-tinged yellow. |
| 3-amino-9-methyl-carbazole | do | do | do | Yellowish-tinged red. |
| 4-aminobenzophenone | do | do | do | Yellow. |
| 3-amino-9-propyl-carbazole | do | do | Acetate | Yellowish-tinged red. |
| 2-amino-3-methoxydiphenylene oxide | do | Ethylene oxide | do | Reddish-tinged yellow. |
| Do | do | Propylene oxide | do | Do. |
| 4-amino-4'-hydroxydiphenylmethane | do | Ethylene oxide | ZnCl$_4^{2(-)}$ | Yellow. |
| 4-amino-4'-hydroxy-(2,2)-diphenylpropane | do | do | ZnCl$_4^{2(-)}$ | Do. |
| p-Toluidine | do | Propylene oxide | ZnCl$_4^{2(-)}$ | Do. |
| p-Anisidine | do | do | SO$_4^{(-)}$ | Do. |
| 1-aminonaphthalene | do | do | SO$_4^{(-)}$ | Do. |
| 4-aminodiphenyl-ether | do | do | SO$_4^{(-)}$ | Reddish-tinged yellow. |
| 4-aminodiphenyl-sulphone | do | do | Cl$^{(-)}$ | Yellow. |
| 3-amino-9-ethylcarbazole | do | do | Cl$^{(-)}$ | Yellowish-tinged red. |
| 3-aminobenzoic acid | do | Ethylene oxide | Acetate | Yellow. |
| 1-amino-4-tert.-butylbenzene | do | Propylene oxide | Cl$^{(-)}$ | Do. |
| Do | do | Ethylene oxide | Cl$^{(-)}$ | Do. |
| 1-amino-3,4-diethoxybenzene | do | Propylene oxide | Cl$^{(-)}$ | Reddish-tinged yellow. |
| 1-aminodiphenylmethane | 1,3,3-trimethyl-5-chloro-2-methylene-2,3-dihydroindole | do | Cl$^{(-)}$ | Yellow. |
| 3-amino-9-ethylcarbazole | do | do | Cl$^{(-)}$ | Yellowish-tinged red. |
| Do | 1,3,3-trimethyl-5-carboxy-2-methylene-2-3-dihydroindole | do | Cl$^{(-)}$ | Do. |
| Do | 1,3,3-trimethyl-5-carboethoxy-2-methylene-2,3-dihydroindole | do | Cl$^{(-)}$ | Red. |
| 2-amino-3-methoxydiphenylene oxide | 1,3,3-trimethyl-5-carboxy-2-methylene-2,3-dihydroindole | Ethylene oxide | Acetate | Yellowish-tinged red. |
| 3-aminophenylpropionic acid | 1,3,3-trimethyl-2-methylene-2,3-dihydroindole | do | do | Yellow. |
| 3-aminobenzophenone | do | do | do | Do. |
| 2-aminobenzoic acid | 2,3-dimethylbenzothiazoliummethosulphate | do | Acetate methosulphate. | Do. |

EXAMPLE 2

Ethylene oxide is passed for 10 hours at 100° through a solution, in 200 g. of glacial acetic acid of 10 g. of azo base obtained by coupling 1,3,3-trimethyl-2-methylene-indoline with p-toluidine and treatment of the coupling product with alkali. The resulting solution of the dyestuff of the composition

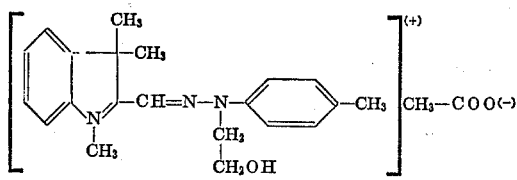

in aqueous liquors dyes fabrics of polyacrylonitrile in yellow shades of good fastness to light and to wet processing.

EXAMPLE 3

Ethylene oxide is passed for 7 hours through a solution, in 150 g. of glacial acetic acid, of 5 g. of azo base obtained by coupling 5-nitro-1,3,3-trimethyl-2-methylene-2,3-dihydroindole with diazotised 3,4-diisopropoxyaniline and treatment of the coupling product with alkali. The resulting solution of the dyestuff of the composition

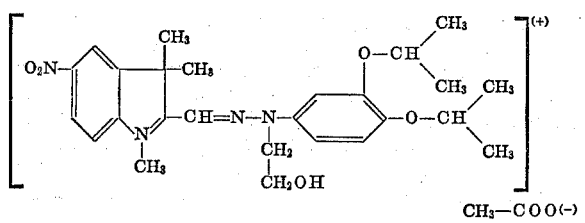

in aqueous liquors dyes fabrics of polyacrylonitrile in scarlet-red shades. If the procedure indicated in Example 1 is followed, the chloride of the dyestuff is obtained in red crystals via the carbinol base by reaction with hydrochloric acid. Yield 2.5 g.

EXAMPLE 4

20 g. of azo base obtained by coupling 1,3,3-trimethyl-2-methylene-2,3-dihydroindole with diazotized 4-aminoazobenzene and reaction of the coupling product with alkali, are dissolved in 200 ml. of glacial acetic acid. Ethylene oxide is passed into the solution for 10 hours. The resulting solution of the dyestuff of the composition

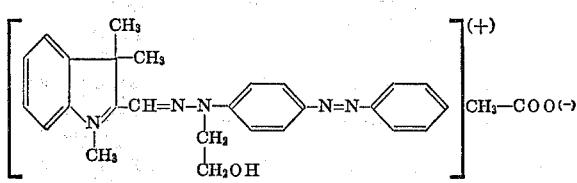

in aqueous liquors dyes fabrics of polyacrylonitrile in strongly reddish-tinged yellow shades of good fastness to light and to wet processing.

EXAMPLE 5

10 g. of azo base obtained from 1,3,3-trimethyl-2-methylene-2,3-dihydroindole and 3-amino-9-ethylcarbazole are dissolved in 250 ml. of glacial acetic acid and ethylene oxide is passed into the solution at 100° for 7 hours. The reaction mixture is introduced into ice-water and after addition of 100 ml. of benzene is rendered alkaline with 20% strength sodium hydroxide solution whilst stirring. After addition of 60 ml. of approx. 15% strength hydrochloric acid, 2.0 g. of the dyestuff are obtained in red-violet crystals from the benzene phase. The dyestuff, which can be further purified by recrystallization from water in the presence of charcoal, corresponds to the fomula

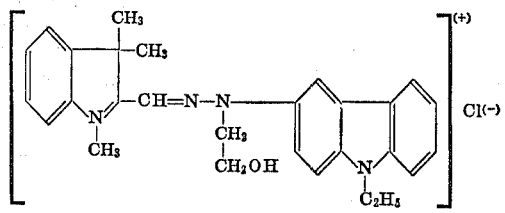

and dyes fabrics of polyacrylonitrile in scarlet-red shades.

If the solution obtained by the reaction with ethylene oxide is used for dyeing, dyeings of scarlet-red shades of good fastness to light and to wet processing are again obtained on polyacrylonitrile, with the color strength corresponding to complete conversion of the azo base to the alkylated dyestuff.

EXAMPLE 6

20 g. of the dyestuff base of the formula

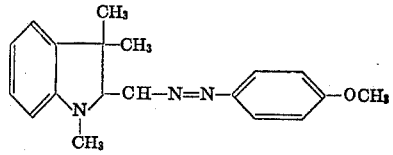

are dissolved in 60 g. of acetic acid methyl ester and 20 g. of acetic acid. Ethylene oxide is passed in for apporx. 5 hours at 20–30° C. and the reaction is allowed to continue for 12 hours at this temperature. The acetic acid methyl ester is then distilled off via a bridge. A sample of the dyestuff solution must give a clear solution in water. If necessary, 5 g. of acetic acid are added and ethylene oxide is again passed in. Dissolved ethylene oxide is removed by again distilling. The residue is made up to 80 g. with water, and filtered. An approx. 25% strength solution of the dyestuff of the formula

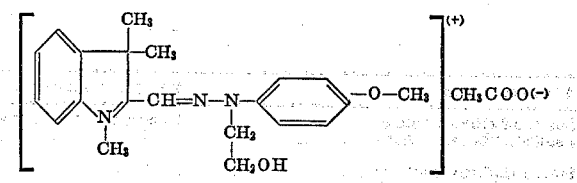

is obtained. The solution of the dyestuff can be measured out easily and polyacrylonitrile fibres and acid-modified polyester fibres can be dyed with it in a strong yellow shade.

EXAMPLE 7

20 g. of the dyestuff base of the formula

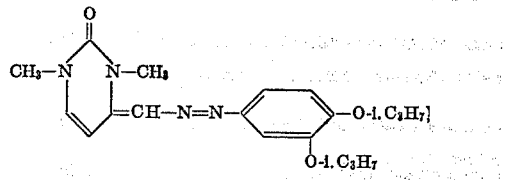

are dissolved in 200 g. of acetic acid and ethylene oxide is slowly passed through the solution for 12–14 hours at 40–60° C. Thereafter, dissolved ethylene oxide is removed in vacuo and a part of the acetic acid is distilled off. An approximately 10% strength solution of the dyestuff of the following formula

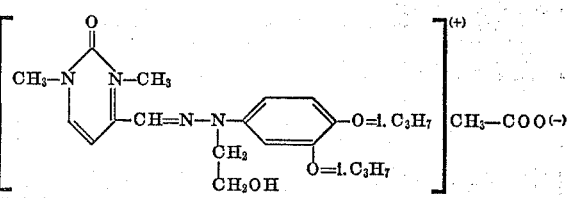

is obtained in an acetic acid/acetic acid glycol ester mixture. The solution of the dyestuff dyes fabrics of polyacrylonitrile, in an aqueous liquor, in red-yellow shades. The solution, on addition of aqueous ZnCl₂ solution, yields the ZnCl₂ salt in the form of greenish crystals.

EXAMPLE 8

10 g. of the dyestuff base of the following formula

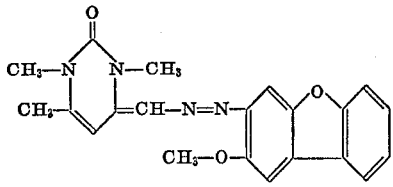

are dissolved in 100 g. of acetic acid. Ethylene oxide is passed into the solution at 45–55° C. until the acetic acid has been largely consumed, which as a rule is the case after approx. 10 to 12 hours. The resulting solution of the dyestuff of the formula

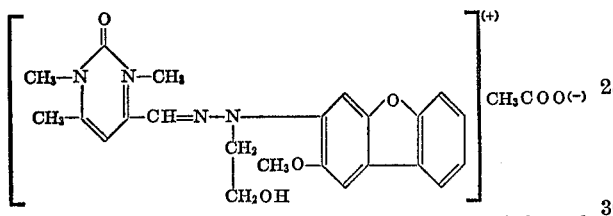

in acetic acid glycol ester/acetic acid dyes fabrics of polyacrylonitrile in red-yellow shades.

EXAMPLE 9

10 g. of the following dyestuff base

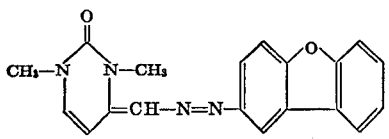

are dissolved in 100 g. of acetic acid and 60–70 g. of propylene oxide are slowly added dropwise at 50–60° C. so that the mixture barely refluxes. Over the course of 14–16 hours, the mixture reacts to give a product which is probably a mixture of the following two components:

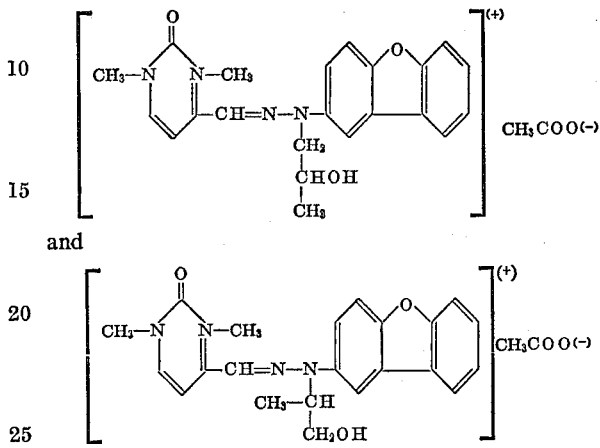

and

The dyestuff solution dyes fabrics of polyacrylonitrile, in an aqueous liquor, in red-yellow shades.

The dyestuff solution can be freed of a part of the solvent by distillation in vacuo and can be employed in a concentrated form for dyeing. If 20 ml. of the dyestuff solution are mixed with 60 ml. of water and 30 ml. of 5% strength aqueous hydrochloric acid, 2.2 g. of the chloride of the dyestuff precipitate in the form of orange-red crystals.

If the components mentioned in the table are treated as indicated in Example 9, dyestuffs or dyestuff solutions are obtained which dye fabrics of polyacrylonitrile in the color shades indicated.

| Amine component | Methylene component | Epoxide | Anion | Color shade |
|---|---|---|---|---|
| 3-amino-9-ethylcarbazole | 1,3,6-trimethyl-4-methylenepyrimidone-(2) | Ethylene oxide | Acetate | Red. |
| 4-aminodiphenylmethane | do | do | Lactate | Reddish-tinged yellow. |
| 3-aminodiphenylmethane | do | do | do | Do. |
| 3-aminodiphenylene oxide | do | do | Acetate | Strongly reddish-tinged yellow. |
| 2-amino-3-methoxydiphenylene oxide | do | Propylene oxide | do | Do. |
| 4-aminodiphenyl-ether | do | do | Cl⁽⁻⁾ | Reddish-tinged yellow. |
| 1-amine-4-methylsulphonylbenzene | do | do | Cl⁽⁻⁾ | Do. |
| 4-amino-N-methyldiphenylamino | do | Ethylene oxide | Cl⁽⁻⁾ | Red. |
| 3-amino-9-ethylcarbazole | do | do | Cl⁽⁻⁾ | Red. |
| Do | 1,3-dimethyl-4-methylenepyrimidone-(2) | do | Cl⁽⁻⁾ | Red. |
| 3-aminodiphenylene oxide | do | do | Cl⁽⁻⁾ | Strongly reddish-tinged yellow. |
| 3-aminodiphenylene sulphide | do | do | Cl⁽⁻⁾ | Reddish-tinged yellow. |
| 4-aminodiphenyl-ether | do | do | Cl⁽⁻⁾ | Strongly reddish-tinged yellow. |
| 4-amino-4'-hydroxydiphenylmethane | do | do | Cl⁽⁻⁾ | Reddish-tinged yellow. |
| p-Toluidine | do | Propylene oxide | Cl⁽⁻⁾ | Do. |
| 4-aminodiphenylmehane | do | Ethylene oxide | Cl⁽⁻⁾ | Do. |
| 4-amino-4'-nitrodiphenylmethane | do | do | Cl⁽⁻⁾ | Do. |
| p-Anisidine | do | do | Cl⁽⁻⁾ | Strongly reddish-tinged yellow. |
| Aniline | do | do | Cl⁽⁻⁾ | Reddish-tinged yellow. |
| p-Toluidine | do | Propylene oxide | Cl⁽⁻⁾ | Do. |
| 1-aminonaphthalene | do | do | Cl⁽⁻⁾ | Do. |
| Do | do | Ethylene oxide | Cl⁽⁻⁾ | Do. |
| 4-aminodiphenylsulphone | do | do | Cl⁽⁻⁾ | Do. |
| 1,2,3,4-tetrahydro-5-aminonaphthalene | do | do | Cl⁽⁻⁾ | Do. |
| p-Phenetidine | do | do | Cl⁽⁻⁾ | Do. |
| Do | do | Propylene oxide | Cl⁽⁻⁾ | Do. |
| 4-aminoacetanilide | do | Ethylene oxide | Cl⁽⁻⁾ | Strongly reddish-tinged yellow. |
| 1-amino-3,4-diisopropoxybenzene | do | do | Cl⁽⁻⁾ | Do. |
| p-Chloroaniline | do | do | Cl⁽⁻⁾ | Reddish-tinged yellow. |
| 4-aminobenzophenone | do | do | Cl⁽⁻⁾ | Do. |
| 3-amino-4'-methylbenzophenone | do | do | Cl⁽⁻⁾ | Do. |

EXAMPLE 10

(a) Manufacture of the coupling product of 2,3,3-trimethylindolenine and p-toluidine 107 g. of p-toluidine in a mixture of 310 ml. of concentrated hydrochloric acid and 4,000 ml. of water are diazotized at 0° C. with approx. 300 ml. of 30% strength by volume sodium nitrite solution, and excess nitrite is then destroyed by means of amidosulphonic acid. Thereafter, following the addition of 5 g. of an emulsifier, 159 g. of 2,3,3-trimethylindolenine are added dropwise over the course of ½ hour, and the mixture is adjusted to pH 5 over the course of 6 hours by adding sodium acetate. The mixture is stirred for 3 hours at this pH and is then adjusted to pH 9 with 10% strength sodium hydroxide solution. The free azo base which has precipitated is recrystallized from alcohol with the addition of approx. 3% by volume of 10% strength sodium hydroxide solution and is obtained in yellow crystals. Yield: 230 g.

(b) Reaction of the azo base with 2 mols of ethylene oxide 10 g. of the free azo base are dissolved in 200 ml. of glacial acetic acid and ethylene oxide is passed through the solution at 100° C. for 8 hours. The resulting solution of the pure dyestuff of the formula

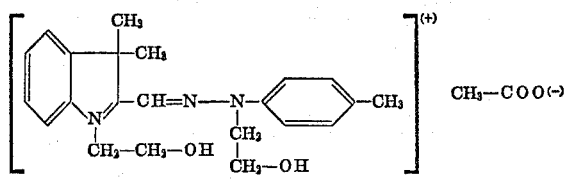

dyes fabrics of polyacrylonitrile in an aqueous liquor in reddish-tinged yellow shades of good fastness to light and to wet processing.

If the procedure indicated in Example 10 is followed and the appropriate components are used, dyestuffs or dyestuff solutions can be obtained which dye fabrics of polyacrylonitrile in the color shades indicated.

| Amine component | Indolenine | Epoxide | Anion | Color Shade |
|---|---|---|---|---|
| Aniline | 2,3,3-trimethylindolenine | Ethylene oxide | Acetate | Yellow. |
| p-Anisidine | do | do | do | Reddish-tinged yellow. |
| 4-aminodiphenylsulphone | do | do | do | Yellow. |
| 4-aminodiphenyl-ether | do | do | do | Reddish-tinged yellow. |
| 3-Aminodiphenyl-ether | do | Propylene oxide | do | Do. |
| p-Phenetidine | do | do | do | Do. |
| Do | 5-chloro-2,3,3-trimethylindolenine | Ethylene oxide | Lactate | Do. |
| 9-ethyl-3-aminocarbazole | 2,3,3-trimethylindolenine | do | Acetate | Do. |
| 4-aminobenzophenone | do | Propylene oxide | do | Orange-red. |
| Do | do | do | do | Yellow. |
| Do | do | Ethylene oxide | do | Do. |
| 2-aminodiphenylene oxide | do | Propylene oxide | do | Reddish-tinged yellow. |
| p-Toluidine | 5-Methoxy-2,3,3-trimethylindolenine | Ethylene oxide | do | Do. |
| Do | do | Propylene oxide | do | Do. |
| Do | 5-cyclohexyl-2,3,3-trimethylindolenine | Ethylene oxide | do | Yellow. |
| Do | 2,3,3,5-tetramethylindolenine | do | do | Do. |
| 1-amino-4-tert.-butylbenzene | 2,3,3-trimethylindolenine | do | do | Do. |
| Do | 5-carboxy-2,3,3-trimethylindolenine | do | do | Reddish-tinged yellow. |
| Do | 5-methylsulphonyl-2,3,3-trimethylindolenine | do | do | Do. |
| p-Chloroaniline | 2,3,3-trimethylindolenine | Propylene oxide | do | Yellow. |
| p-Anisidine | 5-benzyloxy-2,3,3-trimethylindolenine | Ethylene oxide | do | Do. |
| Do | 5-cyclohexyl-2,3,3-trimethylindolenine | do | do | Do. |
| Do | 5-methoxy-2,3,3-trimethylindolenine | do | do | Strongly reddish-tinged yellow. |
| Do | 5-carboxy-2,3,3-trimethylindolenine | do | do | Do. |
| p-Toluidine | 5-cyano-2,3,3-trimethylindolenine | do | do | Yellowish-tinged red. |
| 1,2,3,4-tetrahydro-5-aminonaphthalene | 5-methoxy-2,3,3-trimethylindolenine | Propylene oxide | do | Reddish-tinged yellow. |
| Do | 5-chloro-2,3,3-trimethylindolenine | Ethylene oxide | do | Yellow. |
| 4-Ethylaniline | do | do | do | Do. |
| Do | 2,3,3-trimethylindolenine | do | do | Do. |
| 4-amino-N-ethyldiphenyl-amine | do | do | do | Yellowish-tinged red. |
| 4-amino-4'-ethoxy-N-methyldiphenylamine | do | do | do | Red. |
| Do | 5-chloro-2,3,3-trimethylindolenine | do | do | Red. |
| 9-ethyl-3-aminocarbazole | 2,3,3,5-tetramethylindolenine | Propylene oxide | do | Orange-red. |
| 3-aminodiphenylenesulphate | 2,3,3-trimethylindolenine | Ethylene oxide | do | Yellow. |
| Do | 5-trifluoromethyl-2,3,3-trimethylindolenine | do | do | Do. |
| 1-amino-5-methoxynaphthalene | 2,3,3-trimethylindolenine | do | do | Reddish-tinged yellow. |
| 1-amino-5-benzyloxynaphthalene | do | do | do | Do. |
| 4-dodecylaniline | 5-methoxy-2,3,3-trimethylindolenine | do | do | Do. |
| 3,4-dimethoxyaniline | 2,3,3-trimethylindolenine | do | do | Do. |
| 4-aminodiphenylsulphone | 5-chloro-2,3,3-trimethylindolenine | do | do | Yellow. |
| 3-amino-4-methoxyphenylbenzylsulphone | 2,3,3-trimethylindolenine | do | do | Do. |
| 2,4-diethoxyaniline | 5-chloro-2,3,3-trimethylindolenine | do | do | Reddish-tinged yellow. |
| 4-aminoazobenzene | 2,3,3-trimethylindolenine | do | do | Do. |
| 4,4'-diaminodiphenylmethane | do | do | do | Yellow. |
| 4-amino-4'-hydroxy-2,2-diphenylpropane | do | do | do | Do. |
| 4-aminoazobenzene | 6,7-benzo-2,3,3-trimethylindolenine | do | do | Strongly reddish-tinged yellow. |

EXAMPLE 11

(a) Manufacture of the coupling product of 4-aminodiphenylmethane and 2,3,3-trimethylindolenine 92 g. of 4-aminodiphenylmethane in a mixture of 160 ml. of concentrated hydrochloric acid and 1,000 ml. of water are diazotized at 0° C. with approx. 120 ml. of 30% strength by volume sodium nitrite solution. After destroying excess nitrite by means of amidosulphonic acid, 79 g. of 2,3,3-trimethylindolenine are added dropwise over the course of 1 hour and the mixture is neutralised with 10% strength sodium hydroxide solution, initially slowly and subsequently more rapidly, to pH 4–5 over the course of a total of 15 hours. The azo base hydrochloride which has precipitated is filtered off, washed with 5% strength sodium chloride solution and dried in vacuo at 50° C. Yield 125 g.

(b) Reaction of the azo base hydrochloride with 2 mols of ethylene oxide

Ethylene oxide is passed through a solution of 20 g. of azo base hydrochloride in 200 ml. of glacial acetic acid for 7 hours at 100° C. The resulting solution of pure dyestuff of the formula

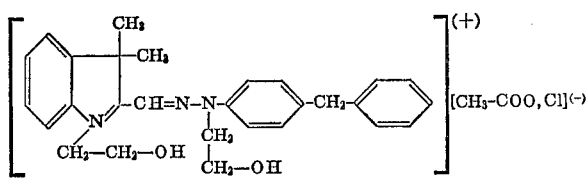

dyes fabrics of polyacrylonitrile in an aqueous liquor in reddish-tinged yellow shades of good fastness to light and to wet processing.

EXAMPLE 12

(a) Manufacture of the coupling product of 2,3,3-trimethylindolenine and 2-aminodibenzofurane 43.8 g. of 2-aminodibenzofurane hydrochloride are dissolved in a mixture of 64 ml. of concentrated hydrochloric acid and 800 ml. of water at 60° C. and the fine crystal paste which is produced at 0° C. is diazotized with 39 ml. of 30% strength by volume sodium nitrite solution. After adding 1.2 g. of emulsifier, 31.6 g. of 2,3,3-trimethylindolenine are added dropwise and the mixture is then adjusted to pH 4 over the course of 4 hours by means of 5% strength aqueous sodium hydroxide solution at stirred for a further 10 hours at room temperature. The crude azo base hydrochloride which has precipitated in reddish-yellow crystals is recrystallized from benzene. Melting point: 232–234° C., yield: 35.0 g.

(b) Reaction of the azo base hydrochloride with 2 mols of ethylene oxide 10 g. of azo base hydrochloride are dissolved in 250 ml. of glacial acetic acid and ethylene oxide is passed through the solution for 9 hours at 90–95° C. The dyestuff solution is mixed with a 5-fold volume of ice/water, and then with 5% strength hydrochloric acid and with aqueous $ZnCl_2$ solution. The dyestuff which has precipitated in reddish-yellow crystals is recrystallized from water with the addition of charcoal. 3.6 g. of the dyestuff of the formula

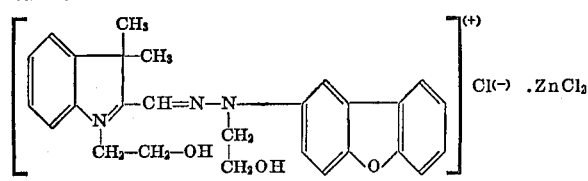

are obtained. It dyes fabrics of polyacrylontrile in strongly reddish-tinged yellow shades of good fastness to light and to wet processing.

If the procedure indicated in Example 12 is followed and the appropriate components are used, it is possible to obtain dyestuffs or dyestuff solutions which dye fabrics of polyacrylonitrile in the colour shades indicated:

EXAMPLE 13

(a) Manufacture of the coupling product of 9,9,9a-trimethyl - 2,3,9,9a - tetrahydrooxazolo - [3,2a] - indole and 4-aminodiphenylmethane.

74.5 g. of 4-aminodiphenylmethane are diazotized in a mixture of 128 ml. of concentrated hydrochloric acid and 1,200 ml. of water at 0° C. After destroying excess nitrite, 82.4 g. of 9,9,9a - trimethyl - 2,3,9,9a - tetrahydrooxazolo - [3,2a] - indole are added to the diazonium salt solution over the course of 1 hour. The mixture is neutralized to pH 3–4 by means of 20% strength aqueous sodium acetate solution over the course of 5 hours. The azo base hydrochloride of the formula

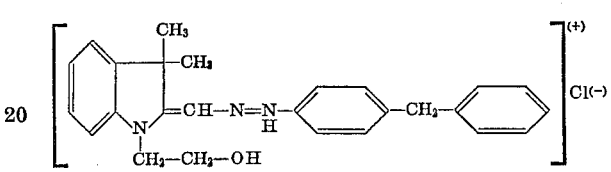

which precipitates in reddish-yellow crystals is washed with 5% strength aqueous sodium chloride solution and then dried in vacuo at 50° C. Yield: 140.0 g.

(b) Reaction of the azo base hydrochloride with 1 mol of ethylene oxide 10 g. of the azo base hydrochloride are dissolved in 200 ml. of glacial acetic acid and ethylene oxide is passed through the solution for 8 hours at 100° C. The reaction mixture is introduced into a mixture of 900 ml. of 5% strength hydrochloric acid and 2,000 g. of ice/water. 4.6 g. of the dyestuff precipitate as yellow crystals after prolonged stirring. The dyestuff corresponds to the formula

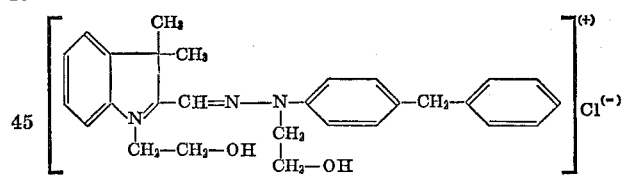

and dyes fabrics of polyacrylonitrile in reddish-tinged yellow shades of good fastness to light and to wet processing.

If the procedure indicated in Example 13 is followed and the appropriate components are used, dyestuffs or dyestuff solutions are obtained which dye fabrics of polyacrrylonitrile in the shades indicated.

| Amino component | Indolenine | Epoxide | Anion | Color Shade |
|---|---|---|---|---|
| 1-aminonaphthalene | 2,3,3-trimethylindolenine | Ethylene oxide | Chlorozincate | Yellow. |
| Do | 5-chloro-2,3,3-trimethylindolenene | do | do | Do. |
| 4-aminodiphenylmethane | do | do | do | Do. |
| 9-ethyl-3-aminocarbazole | do | do | do | Orange-red. |
| 2-aminodiphenylene oxide | do | do | do | Reddishtinged yellow. |
| 1-amino-4-tert.-butylbenzene | 2,3,3-trimethylindolenine | Propylene oxide | do | Yellow. |
| 3,4-diisopropoxyaniline | do | Ethylene oxide | do | Strongly reddishtinged yellow. |
| p-Anisidine | 2,3,3,5-tetramethylindolenine | Propylene oxide | do | Reddishtinged yellow. |
| 1,2,3,4-tetrahydro-5-aminonaphthalene | 2,3,3-trimethylindolenine | Ethylene oxide | do | Yellow. |
| 4-amino-N-ethyl-diphenylamine | 5-chloro-2,3,3-trimethylindolenine | do | do | Yellowish-tinged red. |
| 9-methyl-3-aminocarbazole | do | Propylene oxide | do | Orange-red. |
| Do | 5-carbomethoxy-2,3,3-trimethylindolenine | Ethylene oxide | do | Bluishtinged red. |
| 9-ethyl-3-aminocarbazole | do | do | do | Do. |
| 3-aminodiphenylenesulphide | 5-chloro-2,3,3-trimethylindolenine | do | do | Yellow. |
| 1-amino-5-methoxynaphthalene | 5-methoxy-2,3,3-trimethylindolenine | do | do | Strongly reddish-tinged yellow. |
| 3-amino-4-methoxyphenylbenzylsulphone | 5-ethyl-2,3,3-trimethylindolenine | do | do | Yellow. |

| Amino component | Oxazolo-[3,2a]-indole | Epoxide | Anion | Color shade |
|---|---|---|---|---|
| 3-aminodiphenylene oxide | 7,9,9,9a-tetramethyl-2,3,9,9a-tetrahydrooxazolo-[3,2]-indole. | Ethylene oxide | Cl⁻ | Reddish-tinged yellow. |
| 3-aminodiphenylene sulphide | 7-chloro-9,9,9a-trimethyl-2,3,9,9a-tetrahydro-oxazolo-[3,2a]-indole. | Propylene oxide | Cl⁻ | Yeloow. |
| 4-aminodiphenylmethane | 5,6-benzo-9,9,9a-trimethyl-2,3,9,9a-tetrahydro-oxazolo-[3,2a]-indole. | Ethylene oxide | Cl⁻ | Strongly reddish-tinged yellow. |
| 4-aminodiphenyl-ether | 7-carboxy-9,9,9a-trimethyl-2-phenoxymethyl-2,3,9,9a-tetrahydrooxazolo-[3,2a]-indole. | ....do.... | Cl⁻ | Orange. |
| 1-aminonaphthalene | 7-cyclohexyl-5,9,9,9,a-tetramethyl-2,3,9,9a-tetrahydrooxazolo-[3,2a]-indole. | ....do.... | Cl⁻ | Yellow. |
| 2-amino-3-methoxydiphenylene oxide | 7-methoxy-9,9,9a-trimethyl-2,3,9,9a-tetrahydro-oxazolo-[3,2a]-indole. | Butylene oxide-(1,2). | Cl⁻ | Reddish-tinged yellow. |
| 4-amino-4'-ethoxy-N-methyldiphenylamine | 7,9,9,9a-tetramethyl-2,3,9,9a-tetrahydrooxazolo-[3,2a]-indole. | Ethylene oxide | Cl⁻ | Yellowish-tinged red. |

EXAMPLE 14

(a) Coupling product of 9,9,9a-trimethyl-2,3,9,9a - tetrahydroxazolo[3,2-a]-indole and 9-ethyl - 3 - aminocarbazole 66.5 g. of 9-ethyl-3-aminocarbazole in a mixture of 90 ml. of concentrated hydrochloric acid and 800 ml. of water are diazotized with 60 ml. of 30% strength by volume sodium nitrite solution; after destroying the excess nitrite, 51.5 g. of 9,9,9a-trimethyl - 2,3,9,9a - tetrahydrooxazolo-[3,2a]-indole are added and the mixture is then adjusted to pH 3–4 with 10% strength aqueous sodium hydroxide solution over the course of 4 hours. The coupling product which has precipitated is washed with 5% strength sodium chloride solution and dried in vacuo at 50° C.

(b) Reaction of the azo base hydrochloride with 1 mol of ethylene oxide 30 g. of the azo base hydrochloride are dissolved in 250 ml. of glacial acetic acid. Ethylene oxide is passed into the solution for 7 hours at 90–100° C. The resulting solution of pure dyestuff of the formula

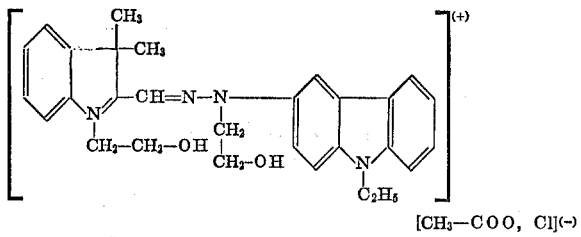

[CH₃—COO, Cl](⁻)

dyes fabrics of polyacrylonitrile in an aqueous liquor in scarlet-red shades of good fastness to wet processing and to light.

EXAMPLE 15

(a) Coupling product of 4-aminodiphenylmethane and a mixture of 9,9,9a-trimethyl-2-allyloxymethyl - 2,3,9, 9a-tetrahydrooxazolo[3,2a] - indole and 9,9,9a - trimethyl-3-allyloxymethyl - 2,3,9,9a - tetrahydrooxazolo-[3,2a]-indole 9.5 g. of 4-aminodiphenylmethane are diazotized in a mixture of 16 ml. of concentrated aqueous hydrochloric acid and 200 ml. of water at 0° C. After destroying excess nitrite, 13.5 g. of the tetrahydrooxazolo-[3,2]-indole mixture are added over the course of 1 hour. The mixture is neutralized to pH 4 with 20% strength aqueous sodium acetate solution over the course of 5 hours. The azo base hydrochloride of the formula

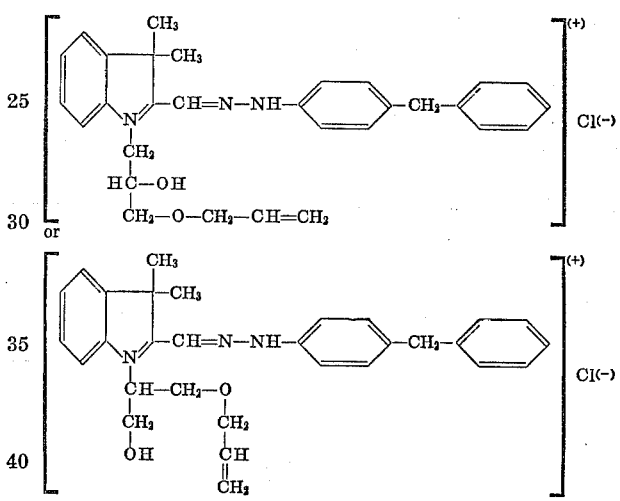

which is obtained in red crystals is converted into the azo base by reaction of a 5% strength sodium hydroxide solution.

(b) Reaction of the azo base with 1 mol of ethylene oxide 7 g. of azo base are dissolved in 150 ml. of glacial acetic acid and ethylene oxide is passed through the solution for 10 hours at 105°. The resulting solution, which contains the pure acetates of the above-mentioned dyestuff, dyes fabrics of polyacrylonitrile in an aqueous liquor in reddish-tinged yellow shades of good fastness to light and to wet processing.

If the procedure indicated in Example 15 is followed and the appropriate components are used, dyestuffs or dyestuff solutions can be obtained which dye fabrics of polyacrylonitrile in the color shades indicated.

| Amine component | Oxazolo-[3,2a]-indole | Epoxide | Anion | Color Shade |
|---|---|---|---|---|
| p-Anisidine | 7-fluoro-9,9,9a-trimethyl-2,3,9,9a-tetrahydro-oxazolo-[3,2a]-indole. | Ethylene oxide | Acetate | Reddish-tinged yellow. |
| p-Phenetidine | ....do.... | Propylene oxide | do | Do. |
| Do | 7-chloro-9,9,9a-trimethyl-2,3,9,9a-tetrahydro-oxazolo-[3,2a]-indole. | ....do.... | do | Do. |
| 3-aminodiphenyl sulphide | 7-ethoxy-9,9,9a-trimethyl-2,3,9,9a-tetrahydro-oxazolo-[3,2a]-indole. | Ethylene oxide | do | Do. |
| 4-aminoazotoluene | ....do.... | Propylene oxide | do | Do. |
| 4-aminoazobenzene | 7-methoxy-9,9,9a-trimethyl-2,3,9,9a-tetrahydro-oxazolo-[3,2a]-indole. | Ethylene oxide | do | Do. |
| 4-aminodiphenylether | 7-carboxy-9,9,9a-trimethyl-2,3,9,9a-tetrahydro-oxazolo-[3,2-a]-indole. | Propylene oxide | do | Orange. |
| p-Toluidine | 2,9,9,9a-tetramethyl-2,3,9,9a-tetrahydrooxazolo-[3,2a]-indole. | ....do.... | do | Yellow. |
| Do | 3,9,9,9a-tetramethyl-2,3,9,9a-tetrahydrooxazolo-[3,2a]-indole. | ....do.... | do | Do. |
| Do | 2,7,9,9,9a-pentamethyl-2,3,9,9a-tetrahydro-oxazolo-[3,2a]-indole. | Ethylene oxide | do | Do. |
| p-Toluidine | 3,7,9,9,9a-pentamethyl-2,3,9,9a-tetrahydro-oxazolo-[3,2a]-indole. | ....do.... | do | Do. |

TABLE—Continued

| Amine component | Oxazolo-[3,2a]-indole | Epoxide | Anion | Color Shade |
|---|---|---|---|---|
| p-Anisidine | 9,9,9a-trimethyl-2-ethyl-2,3,9,9a-tetrahydrooxazolo-[3,2a]-indole | Ethylene oxide | Acetate | Reddish-tinged yellow. |
| Do | 9,9,9a-trimethyl-3-ethyl-2,3,9,9a-tetrahydrooxazolo-[3,2a]-indole | do | do | Do. |
| 3,4-diisopropoxyaniline | 7-chloro-9,9,9a-trimethyl-2,3,9,9a-tetrahydrooxazolo-[3,2a]-indole | Propylene oxide | do | Strongly reddish-tinged yellow. |
| Do | do | Ethylene oxide | do | Do. |
| 1-aminonaphthalene | do | Propylene oxide | do | Yellow. |
| 1-amino-4-isopropylbenzene | 7-methoxy-9,9,9a-trimethyl-2,3,9,9a-tetrahydrooxazolo-[3,2a]-indole | Ethylene oxide | do | Reddish-tinged yellow. |
| 2-amino-3-methoxydiphenylene oxide | do | do | do | Do. |
| m-Anisidine | do | do | do | Do. |
| Do | 9,9,9a-trimethyl-2,3,9,9a-tetrahydrooxazolo-[3,2a]-indole | do | do | Do. |
| Do | 7-chloro-9,9,9a-trimethyl-2,3,9,9a-tetrahydrooxazolo-[3,2a]-indole | do | do | Do. |
| 2-chloro-4-aminoanisole | 9,9,9a-trimethyl-2-(n-hexyloxymethyl)-2,3,9,9a-tetrahydrooxazolo-[3,2a]-indole | Ethylene oxide | do | Do. |
| 4-ethylaniline | 7,9,9,9a-tetramethyl-2,3,9,9a-tetrahydrooxazolo-[3,2a]-indole | do | do | Yellow. |
| Do | 9,9,9a-trimethyl-2,3,9,9a-tetrahydrooxazolo-[3,2a]-indole | Propylene oxide | do | Do. |
| Dehydrothiotoluidine | do | Ethylene oxide | do | Do. |
| 9-ethyl-3-aminocarbazole | 9,9,9a-trimethyl-2,3,9,9a-tetrahydrooxazolo-[3,2a]-indole | Propylene oxide | do | Orange-red. |
| Do | 7-carboxy-9,9,9a-trimethyl-2,3,9,9a-tetrahydrooxazolo-[3,2a]-indole | Ethylene oxide | do | Bluish-tinged red. |
| 2-chloro-4-aminoanisole | 9,9,9a-trimethyl-2-(n-hexyloxymethyl)-2,3,9,9a-tetrahydrooxazolo-[3,2a]-indole | do | do | Reddish-tinged yellow. |
| Aniline | 9,9,9a-trimethyl-2-chloromethyl-2,3,9,9a-tetrahydrooxazolo-[3,2a]-indole | do | do | Yellow. |
| Do | 9,9,9a-trimethyl-3-chloromethyl-2,3,9,9a-tetrahydrooxazolo-[3,2a]-indole | do | do | Do. |
| Do | 9,9,9a-trimethyl-2,3,9,9a-tetrahydrooxazolo-[3,2a]-indole | Propylene oxide | do | Do. |
| o-Anisidine | do | 1,2-butylene oxide | do | Do. |
| Do | do | Ethylene oxide | do | Do. |

EXAMPLE 16

A fabric of polyacrylonitrile is printed with a printing paste which was manufactured in the following manner: 20 g. of the dyestuff of the formula

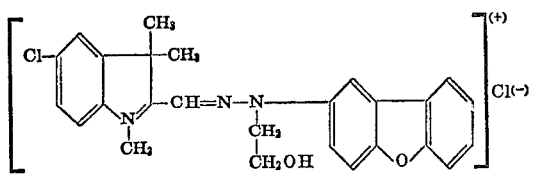

33 g. of thiodiethylene glycol, 20 g. of cyclohexanol and 20 g. of 30% strength acetic acid are covered with 220 g. of hot water and the resulting solution is added to 330 parts by weight of a thickener (gum arabic used as a aqueous solution of 3% of weight). 20 g. of zinc nitrate solution are added thereto. The print obtained is dried, steamed for 30 minutes and subsequently rinsed. A reddish-tinged yellow print of good fastness properties is obtained.

EXAMPLE 17

Acid-modified polyglycol terephthalate fibres are introduced at 20° C., using a liquor ratio of 1:40, into an aqueous bath which per litre contains 3 to 10 g. of sodium sulphate, 0.1 to 1 g. of oleyl polyglycol ether (50 mols of ethylene oxide), 0–15 g. of dimethylbenzyldodecylammonium chloride and 0.15 g. of the dyestuff of the formula

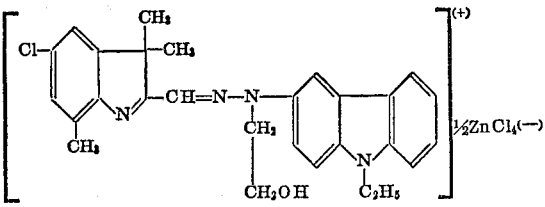

and which has been adjusted to pH 4–5 with acetic acid. The mixture is heated to 100° C. over the course of 30 minutes and the bath is kept at this temperature for 60 minutes. Thereafter the fibres are rinsed and dried. A yellowish-tinged red dyeing of very good fastness properties is obtained.

EXAMPLE 18

Polyacrylonitrile fibres are introduced, using a liquor ratio of 1:40, into an aqueous bath at 40° C. which per litre contains 0.75 g. of 30% strength acetic acid, 0.38 g. of sodium acetate and 0.15 g. of the dyestuff of the formula

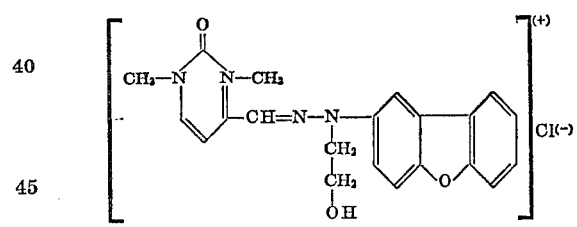

The bath is heated to the boil over the course of 20–30 minutes and kept at this temperature for 30–60 minutes. After rinsing and drying, a strongly reddish-tinged yellow dyeing having very good fastness properties is obtained.

EXAMPLE 19

30 g. of polyacrylonitrile fabric are introduced into one litre of a dyebath at 60–80° C., which contains 0.6 g. of a 10% strength solution of the dyestuff

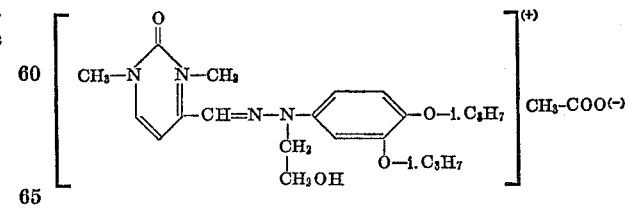

and 0.5 g. of an ethylene oxide adduct of 50 mols of ethylene oxide to 1 mol of oleyl alcohol and which has been adjusted to a pH-value of 4–5 by adding acetic acid. The dyebath is heated to 98° C. and the temperature is maintained for about 90 minutes whilst frequently swishing the fabric. Thereafter, the fabric is washed in a bath which contains 1–2 g./l. of a non-ionic detergent (for example a nonylphenol reacted with 10 mols of ethylene oxide) and is rinsed with water. A light-fast and wash-fast dyeing in a yellow-orange-colored shade is obtained.

We claim:
1. Hydrazone dyestuff of the formula

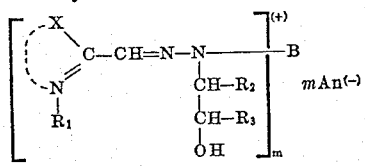

in which $R_1$ is $C_1-C_{18}$-alkyl; $C_1-C_{18}$-alkyl substituted by chloro, fluoro, methoxy, cyano or hydroxy; phenyl; benzyl; phenethyl or

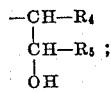

$R_2$ and $R_3$ are hydrogen; $C_1-C_4$-alkyl; $C_1-C_4$-alkyl substituted by chloro, fluoro, methoxy, cyano or hydroxy; $C_2-C_4$-alkenyl; $C_1-C_4$-alkyloxymethyl; $C_2-C_4$-alkenyloxymethyl or phenoxymethyl; at least one of $R_2$ or $R_3$ being hydrogen or $C_1-C_4$-alkyl; $R_4$ and $R_5$ are hydrogen; $C_1-C_{18}$-alkyl; $C_1-C_{18}$-alkyl substituted by chloro, fluoro, methoxy, cyano or hydroxy; $C_2-C_4$-alkenyl; $C_2-C_4$-alkinyl; phenyl; benzyl; $C_1-C_{12}$-alkoxymethyl; $C_2-C_4$-alkenyloxymethyl; or phenoxymethyl; at least one of $R_4$ or $R_5$ being hydrogen or $C_1-C_{18}$-alkyl; X represents the remaining members of an indoline nucleus, an indoline nucleus having a fused 5- or 6-member carbocyclic ring; a pyrimidone nucleus; a benzothiazole nucleus; a quinoxaline nucleus; or a quinazoline nucleus; B is a phenyl nucleus; a tetrahydronaphthalene nucleus; a carbazole nucleus; a diphenylenesulfide nucleus; a diphenylene oxide nucleus; a tetrahydrodiphenylene oxide nucleus, a tetrahydrocarbazole nucleus; or a hexahydrocarbazole nucleus; $m$ is a number 1 or 2; and $An^{(-)}$ is an anion.

2. Hydrazone dyestuff of claim 1 having the formula

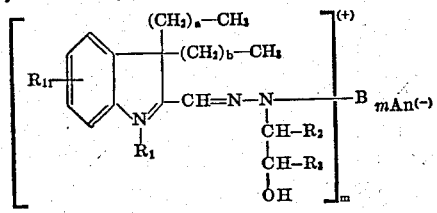

in which $R_{11}$ is hydrogen or one or more members selected from the group consisting of halogen, nitrile, nitro, $C_1-C_{12}$-alkyl, fluoromethyl, phenyl, benzyl, $C_5-C_7$-cycloalkyl, $C_1-C_4$-alkoxy, phenoxy, benzyloxy, amino, $C_1-C_4$-dialkylamino, sulfamoyl, $C_1-C_4$-alkylsulfonyl, phenylsulfonyl, carboxyl, $C_1-C_4$-alkoxycarbonyl, carboxy-$C_1-C_4$-alkyl, phthalimido-$C_1-C_2$-alkyl and a fused benzene ring; $a$ is 0, 1 or 2; and $b$ is 0, 1 or 2.

3. Hydrazone dyestuff of claim 2 in which $a$ is 0; $b$ is 0; $R_1$ is methyl, ethyl, n-propyl, isopropyl or n-butyl, phenyl, benzyl, p-nitrobenzyl, phenethyl or p-nitrophenethyl or

$R_2$ and $R_3$ are hydrogen, methyl, ethyl, allyloxymethyl or phenoxymethyl; at least one of $R_2$ or $R_3$ being hydrogen, methyl or ethyl; $R_{11}$ is hydrogen, or one or more substituents selected from the group consisting of fluorine, chlorine, bromine, nitrile, nitro, sulfamoyl, amino, dimethylamino, diethylamino, methyl, ethyl, n-propyl, dodecyl, methoxy, ethoxy, n-propoxy, n-butoxy, phenoxy, benzyloxy, methylmercapto, ethylmercapto, methylsulfonyl, ethylsulfonyl, phenyl, p-nitrophenyl, benzyl, 4-methoxybenzyl, cyclohexyl, cyclopentyl, trifluoromethyl, trichloromethyl, carboxy, carboxymethyl, carboxyethyl, carbomethoxy, carboethoxy and phthalimidomethyl; or $R_{11}$ is the residual part of a fused benzene ring; and $R_4$ and $R_5$ are hydrogen, methyl, ethyl, chloromethyl, β-chloroethyl, vinyl, allyl, phenyl, benzyl, methoxymethyl, ethoxymethyl, n-propoxymethyl, isopropoxymethyl, n-butoxymethyl, isobutoxymethyl, n-hexyloxymethyl, allyloxymethyl, methallyloxymethyl, phenoxymethyl, or 4-methoxyphenoxymethyl; with at least one of $R_4$ or $R_5$ being hydrogen, methyl or ethyl.

4. Hydrazone dyestuff of the formula

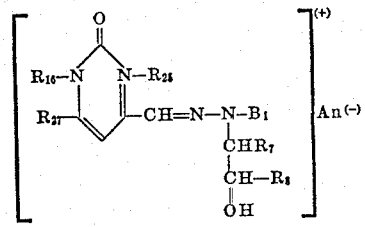

in which $R_7$ is hydrogen, $C_1-C_4$-alkyl, $C_2-C_4$-alkenyl, $C_1-C_4$-alkyloxymethyl, $C_2-C_4$-alkenyloxymethyl or phenoxymethyl; $R_8$ is hydrogen, $C_1-C_4$-alkyl, $C_2-C_4$-alkenyl, $C_1-C_4$-alkoxymethyl, $C_2-C_4$-alkenyloxymethyl or phenoxymethyl, with at least one of the $R_7$ or $R_8$ being hydrogen or $C_1-C_4$-alkyl; $R_{25}$ is methyl, ethyl, n-propyl, n-butyl, cyclohexyl, phenyl, p-chlorophenyl or p-methylphenyl, $R_{26}$ denotes methyl, ethyl, n-propyl, n-butyl, cyclohexyl, phenyl, p-chlorophenyl or p-methylphenyl; $R_{27}$ is hydrogen, methyl, phenyl, p-chlorophenyl or p-methylphenyl; and $B_1$ is a phenyl nucleus, a tetrahydronaphthalene nucleus; a carbazole nucleus; a diphenylenesulfide nucleus; a diphenylene oxide nucleus; a tetrahydrodiphenylene oxide nucleus; a hexahydrodiphenylene oxide nucleus; a tetrahydrocarbazole nucleus; or a hexahydrocarbazole nucleus; $m$ is a number 1 or 2; and $An^{(-)}$ is an anion.

5. Hydrazone dyestuff of the formula

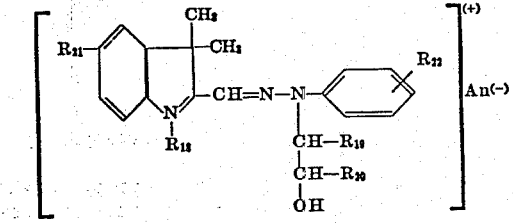

wherein $R_{18}$ denotes methyl or ethyl,
$R_{19}$ denotes hydrogen, methyl or ethyl,
$R_{20}$ denotes hydrogen, methyl or ethyl,
$R_{21}$ denotes hydrogen, chlorine, methyl, methoxy, ethoxy, benzyloxy, carboxy, carbomethoxy, or carboethoxy,
$R_{22}$ denotes hydrogen or one or more methyl, methoxy, ethoxy, i-propoxy, benzyl radicals or together with the phenyl ring denotes a naphthyl, carbazolyl or diphenylene oxide radical and
$An^{(-)}$ denotes an anion.

6. Hydrazone dyestuff of the formula

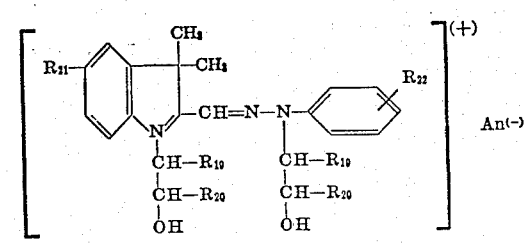

wherein $R_{19}$ denotes hydrogen, methyl or ethyl,
$R_{20}$ denotes hydrogen, methyl or ethyl,
$R_{21}$ denotes hydrogen, chlorine, methyl, methoxy, ethoxy, benzyloxy, carboxy, carbomethoxy, or carboethoxy, $R_{22}$ denotes hydrogen or one or more methyl, methoxy, ethoxy, i-propoxy, benzyl radicals or together with the phenyl ring denotes a naphthyl, carbazolyl or diphenylene oxide radical and $An^{(-)}$ denotes an anion.

7. Hydrazone dyestuff of the formula

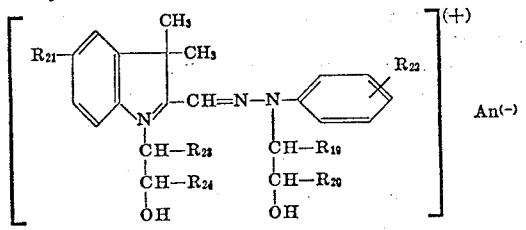

wherein $R_{19}$ denotes hydrogen, methyl or ethyl,
$R_{20}$ denotes hydrogen, methyl or ethyl,
$R_{21}$ denotes hydrogen, chlorine, methyl, methoxy, ethoxy, benzyloxy, carboxy, carbomethoxy, or carboethoxy,
$R_{22}$ denotes hydrogen or one or more methyl, methoxy, ethoxy, i-propoxy, benzyl radicals or together with the phenyl ring denotes a naphthyl, carbazolyl or diphenylene oxide radical and
$R_{23}$ denotes hydrogen, methyl, ethyl or allyloxymethyl and
$R_{24}$ denotes hydrogen, methyl, ethyl or allyloxymethyl and
$An^{(-)}$ denotes an anion.

8. Hydrazone dyestuff of the formula

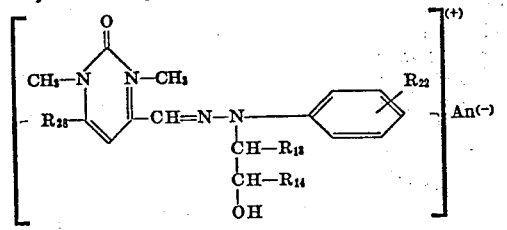

wherein $R_{13}$ denotes hydrogen, methyl, ethyl, n-propyl, allyloxymethyl or phenoxymethyl,
$R_{14}$ denotes hydrogen, methyl, ethyl, n-propyl, allyloxymethyl or phenoxymethyl, with at least one of the radicals $R_{13}$ or $R_{14}$ being hydrogen, methyl or ethyl,
$R_{22}$ denotes hydrogen or one or more methyl, methoxy, ethoxy, i-propoxy, benzyl radicals or together with the phenyl ring denotes a naphthyl, carbazolyl or diphenylene oxide radical and
$R_{28}$ denotes hydrogen, methyl or phenyl and
$An^{(-)}$ denotes an anion.

9. A hydrazone dyestuff of the formula

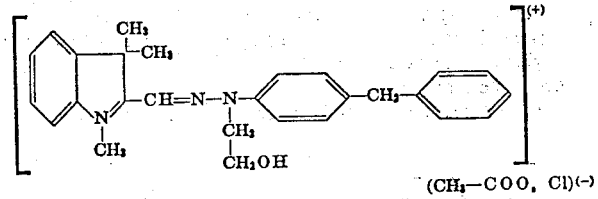

10. A hydrazone dyestuff of the formula

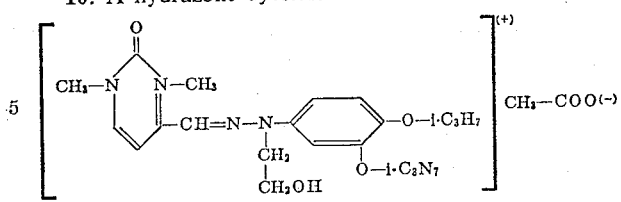

11. A mixture of the hydrazone dyestuffs of the formulae

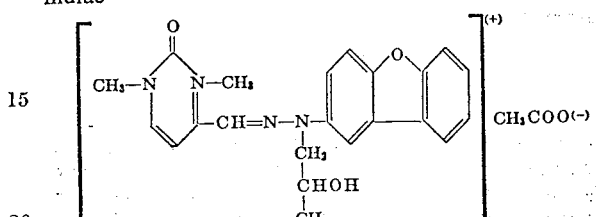

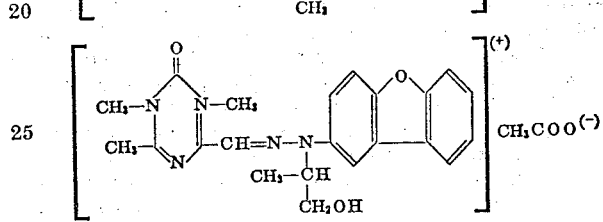

12. A hydrazone dyestuff of the formula

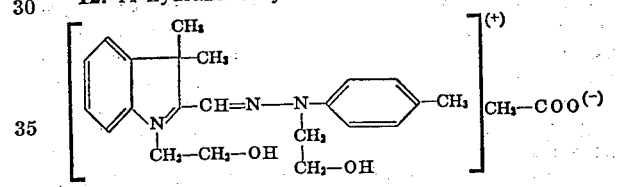

13. A hydrazone dyestuff of the formula

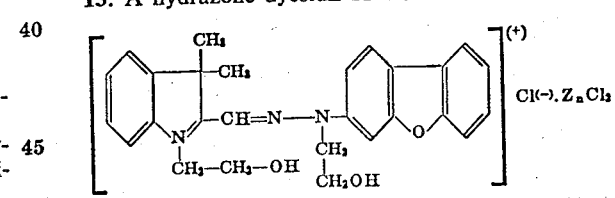

References Cited

UNITED STATES PATENTS

| 3,331,831 | 7/1967 | Raue et al. | 260—162 |
| 3,345,355 | 10/1967 | Raue | 260—165 |

FOREIGN PATENTS

| 226,855 | 4/1973 | Austria | 260—240 G |
| 1,532,806 | 6/1968 | France | 260—240 G |

JOHN D. RANDOLPH, Primary Examiner

U.S. Cl. X.R.

8—3, 7, 12, 177 R, 179, 180; 106—22, 23; 162—162; 260—154, 155, 157, 158, 164, 165